US009954552B2

(12) United States Patent
Gopal et al.

(10) Patent No.: US 9,954,552 B2
(45) Date of Patent: Apr. 24, 2018

(54) TECHNOLOGIES FOR PERFORMING LOW-LATENCY DECOMPRESSION WITH TREE CACHING

(71) Applicant: Intel Corporation, Santa Clara, CA (US)

(72) Inventors: Vinodh Gopal, Westborough, MA (US); Daniel F. Cutter, Maynard, MA (US); James D. Guilford, Northborough, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/473,748

(22) Filed: Mar. 30, 2017

(65) Prior Publication Data

US 2018/0026651 A1 Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
| | |
|---|---|
| *H03M 7/40* | (2006.01) |
| *H03M 7/30* | (2006.01) |
| *G06F 12/08* | (2016.01) |
| *G06F 12/0893* | (2016.01) |

(52) U.S. Cl.
CPC ...... *H03M 7/3084* (2013.01); *G06F 12/0893* (2013.01); *H03M 7/40* (2013.01); *G06F 2212/1044* (2013.01); *G06F 2212/401* (2013.01)

(58) Field of Classification Search
None
See application file for complete search history.

(56) References Cited

U.S. PATENT DOCUMENTS

| | | | | |
|---|---|---|---|---|
| 5,652,857 | A * | 7/1997 | Shimoi | G06F 3/0601 710/68 |
| 9,059,731 | B2 * | 6/2015 | Harnik | H03M 7/40 |
| 2015/0227565 | A1 * | 8/2015 | Amit | H03M 7/6088 707/797 |

* cited by examiner

*Primary Examiner* — Howard Williams
(74) *Attorney, Agent, or Firm* — Barnes & Thornburg LLP

(57) ABSTRACT

Technologies for performing low-latency decompression include a managed node to parse, in response to a determination that a read tree descriptor does not match a cached tree descriptor, the read tree descriptor to construct one or more tables indicative of codes in compressed data. Each code corresponds to a different symbol. The managed node is further to decompress the compressed data with the one or more tables and store the one or more tables in association with the read tree descriptor in a cache memory for subsequent use.

21 Claims, 19 Drawing Sheets

TECHNOLOGIES FOR PERFORMING LOW-LATENCY DECOMPRESSION WITH TREE CACHING

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a data center in which multiple compute resources and storage resources communicate to execute workloads (e.g., applications, processes, threads, etc.), the speed at which the workloads can be processed may be limited by the speed at which data can be communicated among the resources. By compressing the data, such as with entropy encoding, the amount of data to be transferred can be reduced, thereby reducing the data transmission time. However, additional time is then spent to decompress the received compressed data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
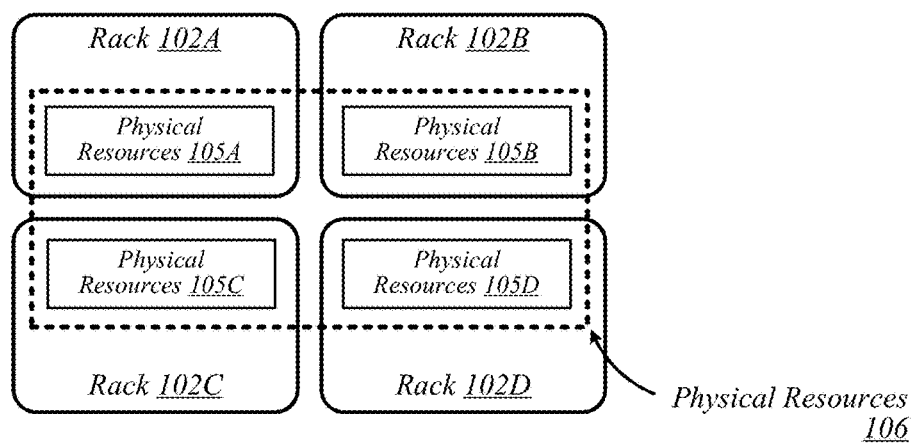
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. In the present description, near memory may be embodied as any memory, such as volatile memory, coupled to the host central processing unit via a high bandwidth, low latency connection for efficient processing while far memory may be embodied as any memory, such as volatile or nonvolatile memory storage, that is larger and slower than the near memory, and is typically coupled to the central processing unit via a comparatively lower bandwidth and/or higher latency connection. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low-latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
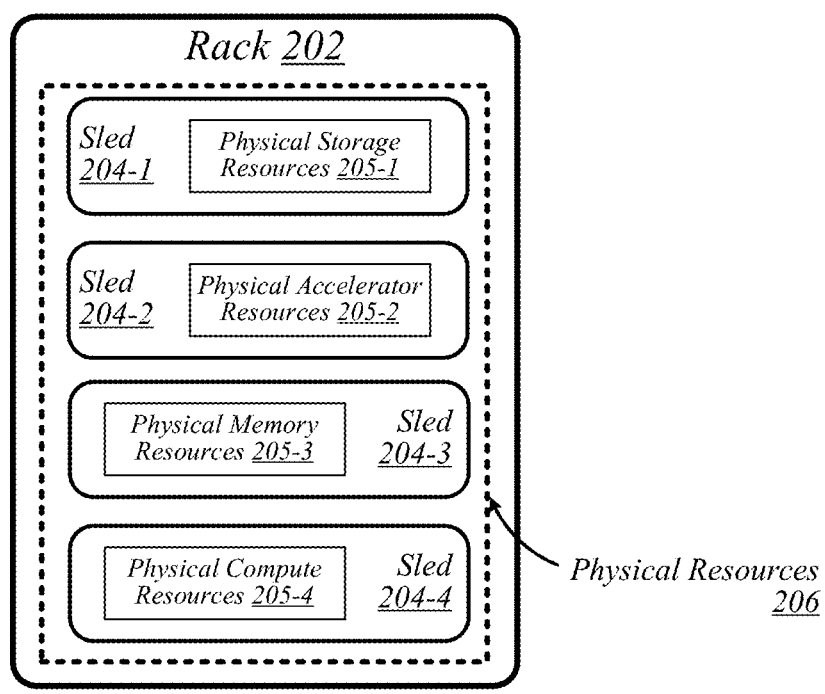
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
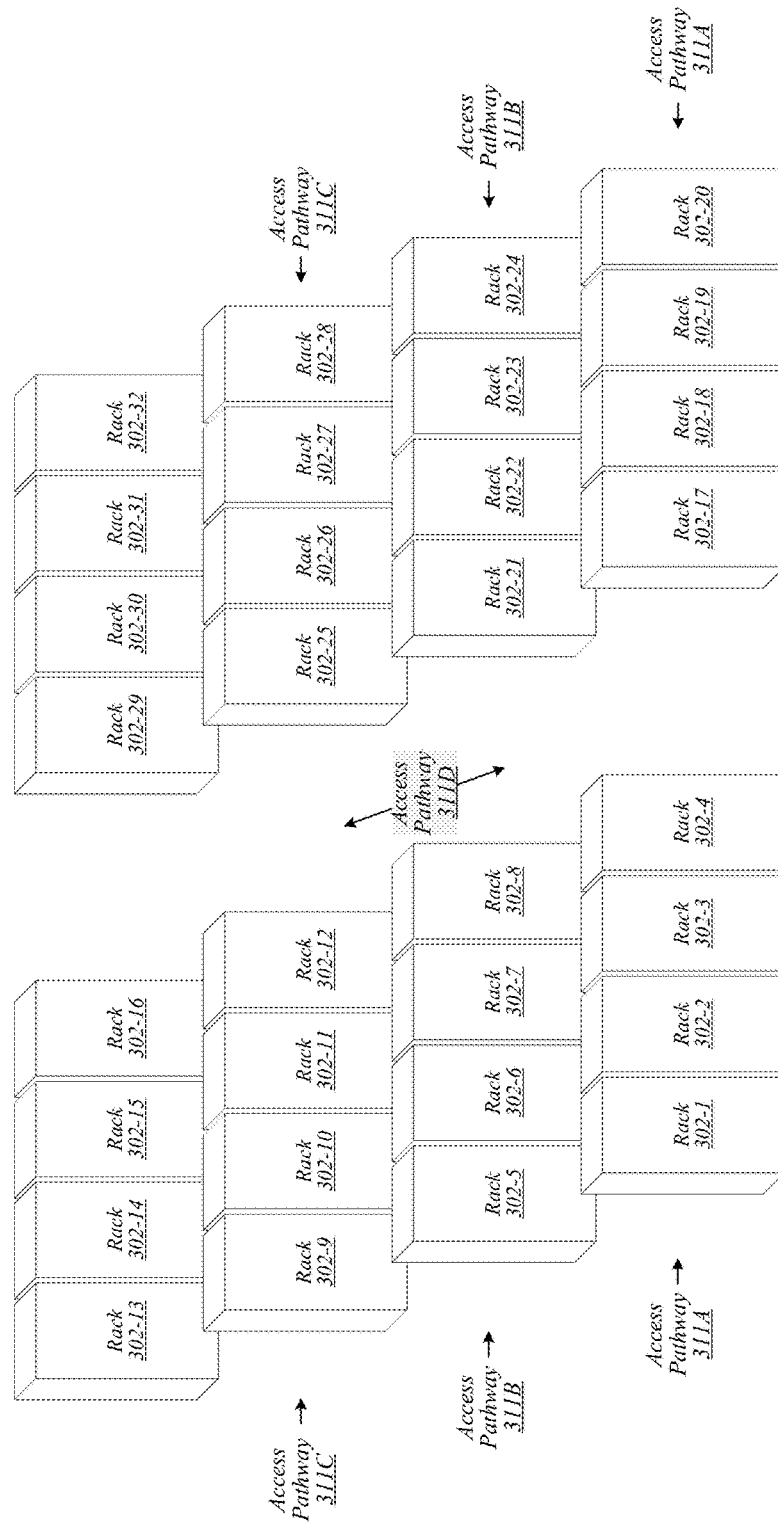
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
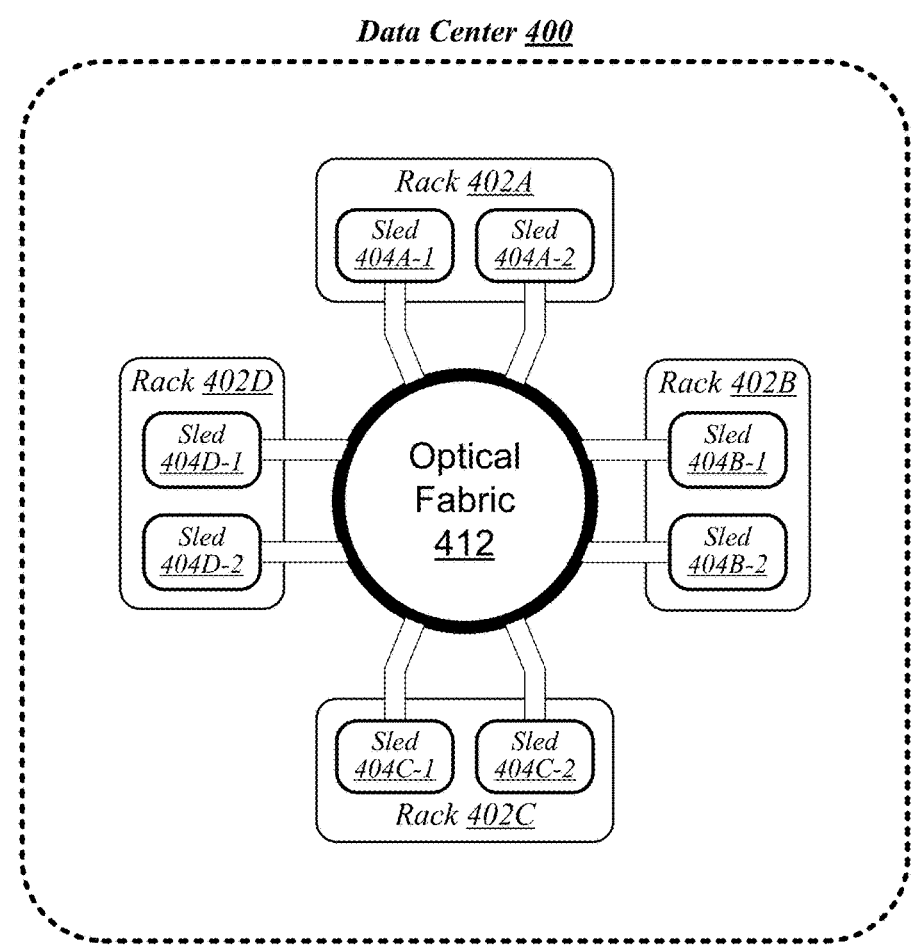
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
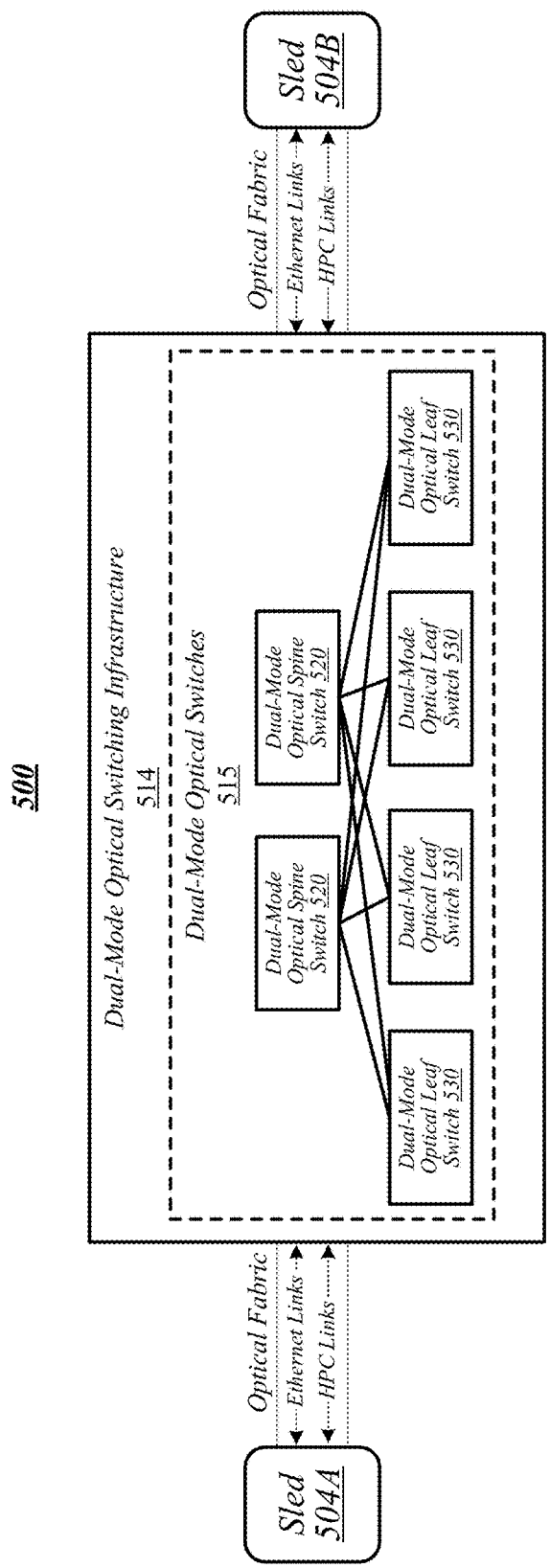
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
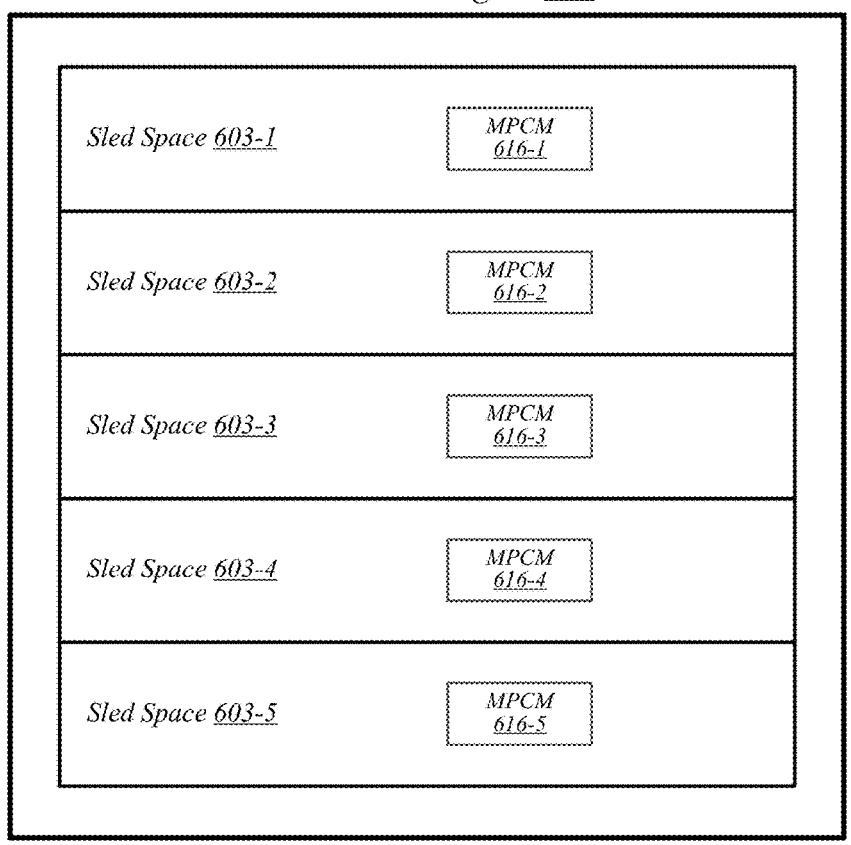
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
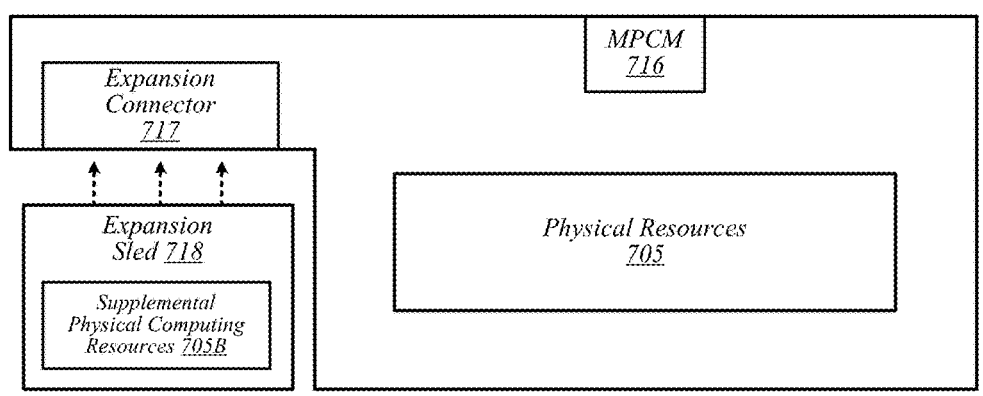
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
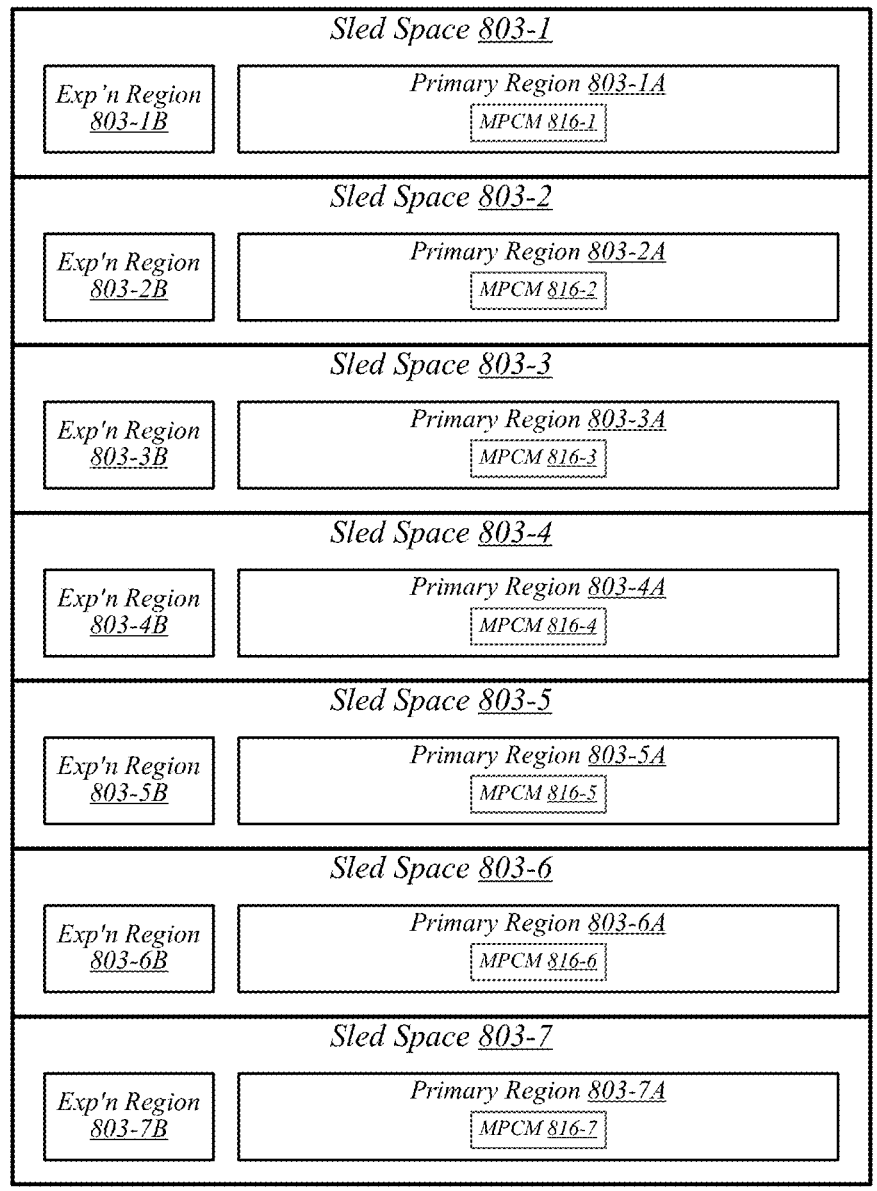
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
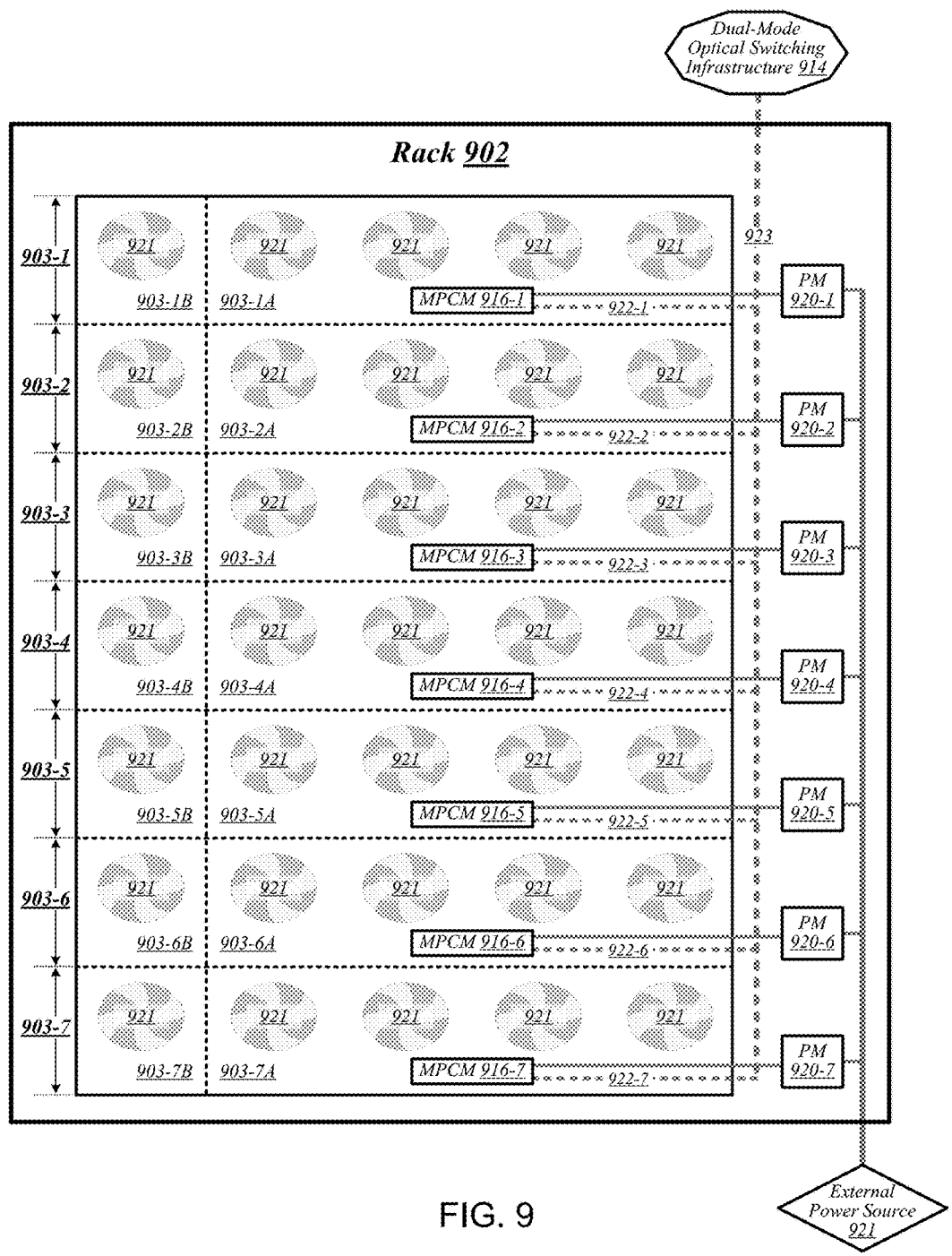
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
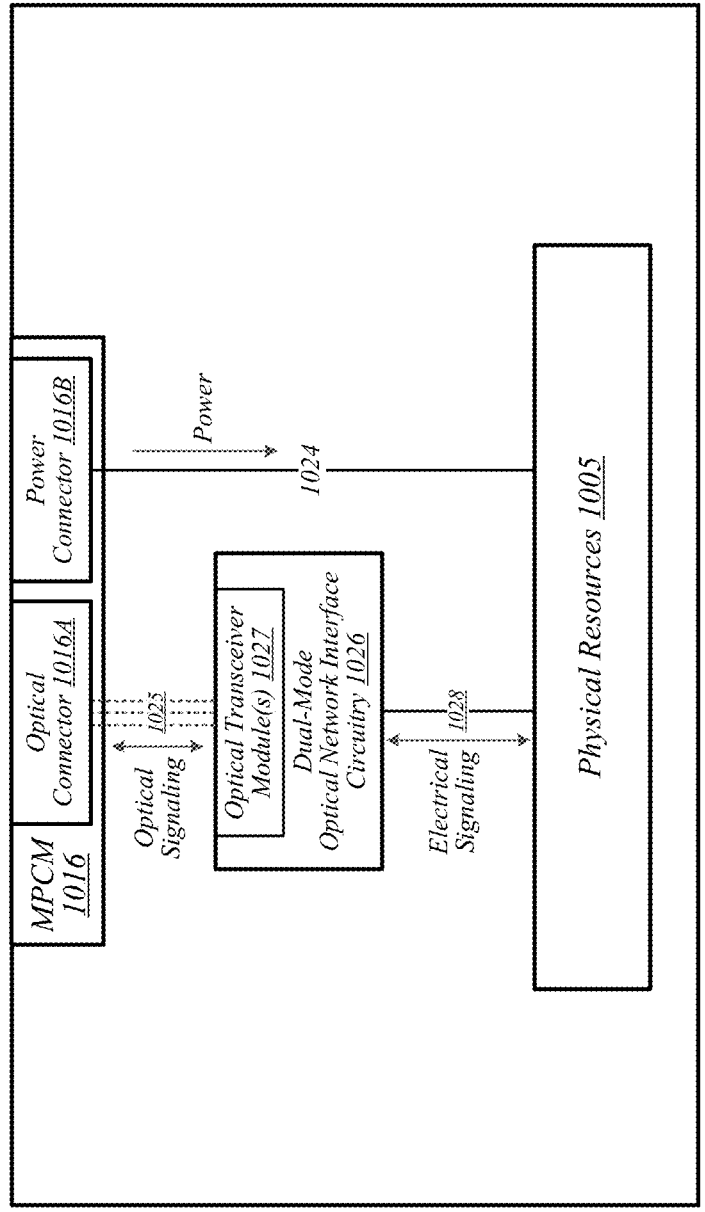
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9.

In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
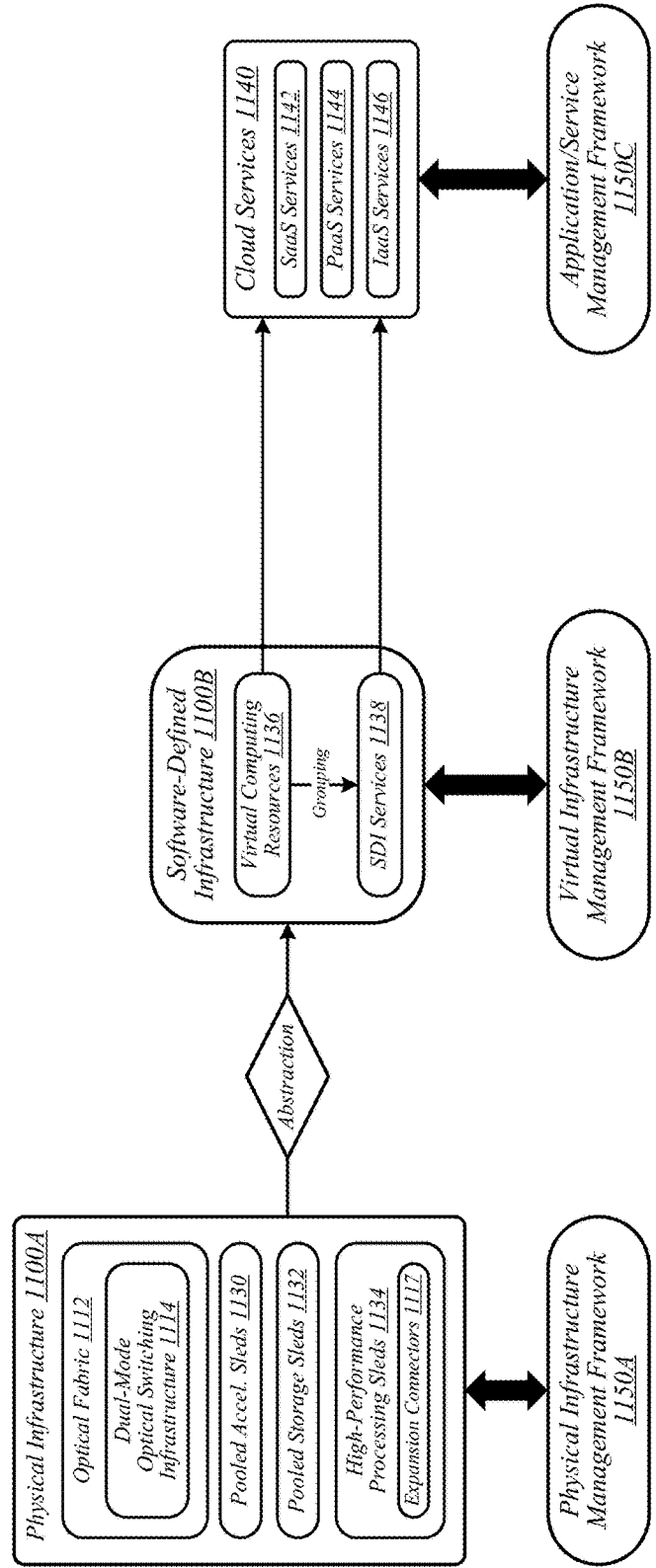
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs) (e.g., a controller coupled to a non-volatile memory chip, such as NAND, and an interface to a host device). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a memory expansion sled, such that the memory that is locally available to that high-performance processing sled 1134 is disaggregated from the processors and memory comprised on that sled. In some embodiments, such a high-performance processing sled 1134 may be configured with memory using an expansion sled that comprises a low-latency SSD. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
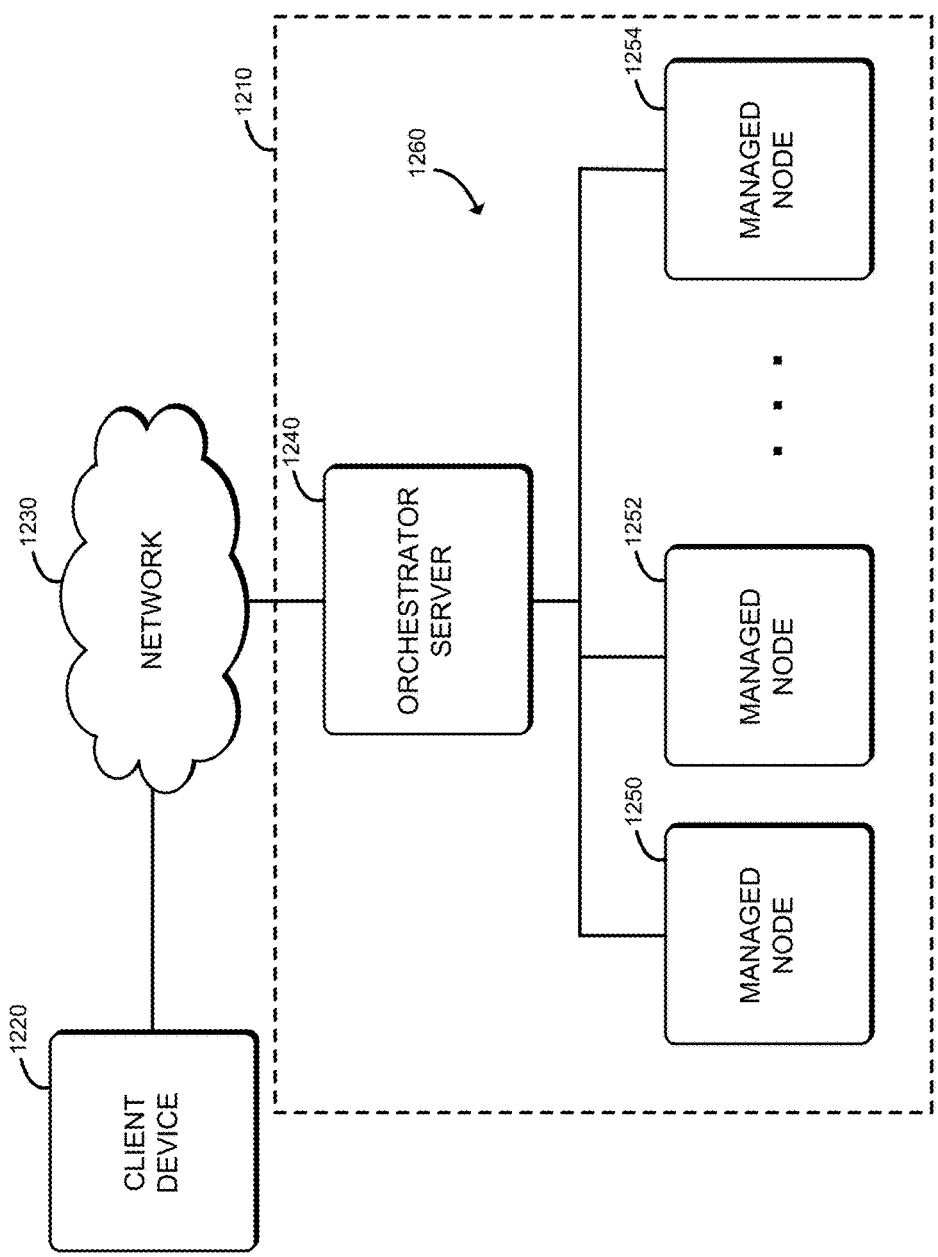
FIG. 12 is a simplified block diagram of at least one embodiment of a system for performing low-latency decompression of data.

As shown in FIG. 12, an illustrative system 1210 for performing low-latency decompression includes a set of managed nodes 1260 in communication with each other and with an orchestrator server 1240. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and assign workloads to the managed nodes 1260 for execution.

The managed nodes 1260 may execute the workloads, such as in virtual machines or containers, on behalf of a user of the client device 1220. Managed nodes 1260 executing respective workloads may issue separate requests to read data and/or write data from or to one or other resources available in the system 1210 (e.g., physical storage resources 205-1, one or more physical memory resources 205-3, etc.). To reduce the amount of data transmitted between the resources in the system 1210, the data may be compressed (e.g., by a resource of a managed node 1260) prior to transmission, and decompressed (e.g., by another resource of a managed node 1260) after receipt of the data.

Typical forms of entropy encoded data sets (e.g., a data stream) may include one or more blocks that are compressed based on the frequency of symbols (e.g., characters, numbers, etc.) present in the decompressed form of the data. For example, in Huffman encoding, a tree (e.g., an abstract data structure that simulates a hierarchical tree structure, with a root value and subtrees of children with a parent node, represented as a set of linked nodes) may be used to associate codes with each symbol present in the uncompressed form of the data. In the tree, the more frequently occurring symbols are associated with shorter codes while the less frequently occurring symbols are associated with longer codes. The symbols are then replaced by the codes, to compress the data. To improve compression ratios, a compressor may assign a different tree to each block in the data set, rather than using a standard tree for all of the blocks. In such systems, the compressor typically stores a definition of the contents of the tree (i.e., a "tree descriptor") in association with the corresponding block (e.g., in a header of the block). As such, in decompressing an entropy encoded data set, a compute device typically performs a sequential process of parsing the tree descriptor for a given block, constructing, from the parsed tree descriptor, one or more tables that correlate the codes and corresponding symbols, and decompressing the block using the one or more tables. In some systems, the compute device may perform a further decompression step, such as a Lempel-Ziv decompression process, on the data set. Regardless, for many systems, the performance of the decompression process is limited by the speed of the tree parsing operation (i.e., the amount of time to parse the tree descriptor and construct the table(s) is greater than the amount of time to replace the codes with the symbols). Furthermore, in applications in which the latency to determine the first byte of a decompressed data block is more important than the latency to determine the last byte of the decompressed data block, the startup time to decode the tree descriptor is particularly detrimental.

In the illustrative embodiment, a managed node 1260 may compress and decompress data using entropy encoding/decoding, such as Huffman encoding, with a set of trees. The Huffman encoding may be combined with other encoding algorithms for additional compression (e.g., Lempel-Ziv based algorithms), such as in the Deflate compression scheme. Regardless, to increase the speed of decompressing the data, the managed nodes 1260 in the illustrative embodiment may cache tree data generated from parsing tree descriptors in the compressed data and reuse the cached tree data to decompress subsequent blocks that have been compressed with those trees. Each tree is indicative of codes associated with different symbols. The length of each code is inversely related to the frequency of the symbol in the uncompresssed form of the data. Different blocks of data may have different frequencies of symbols. Accordingly, one block of data may utilize a different tree than another block of data. By caching the tree data, the set of managed nodes 1260 may avoid the latency in re-parsing the same tree descriptors in subsequent blocks of the compressed data. Similarly, the managed nodes 1260 may compress data by reusing a fixed set of trees associated with a particular type of the data (e.g., log data, metadata, genome data, etc.) to provide a higher "hit rate" (i.e., matches of cached tree data with the trees used to compress the data blocks) and thereby increase the speed and efficiency with which the data is decompressed.

Figure 13:
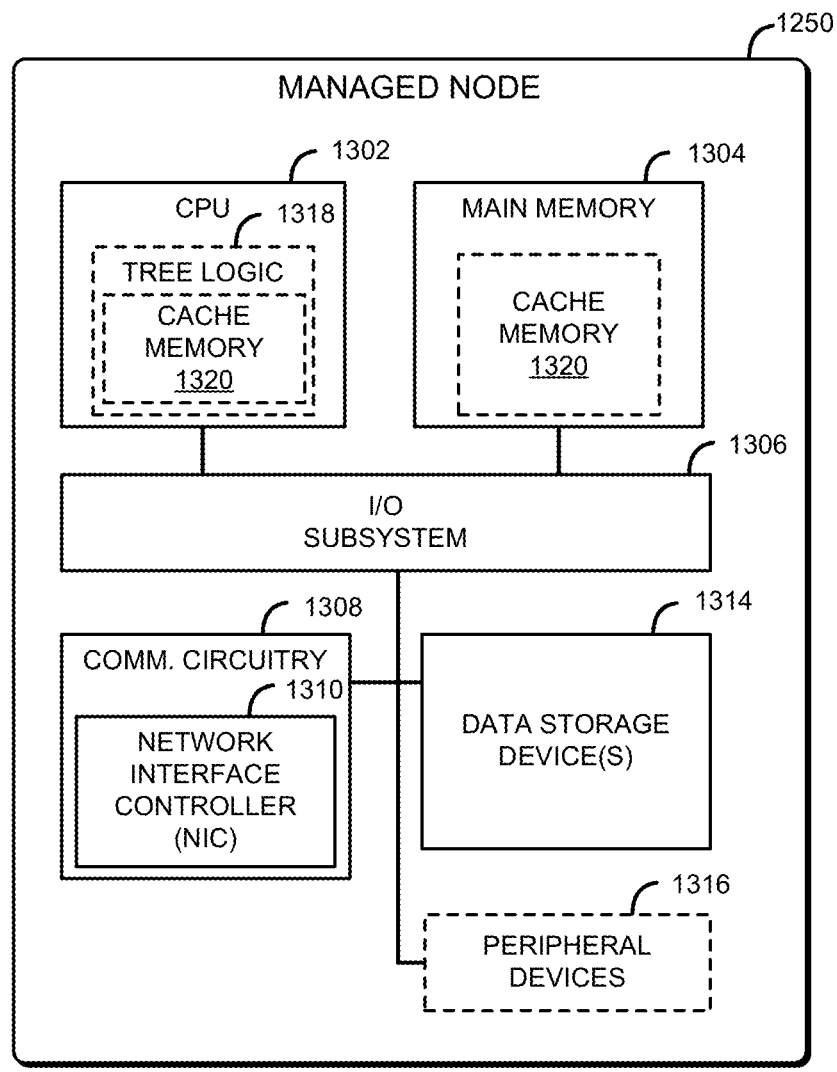
FIG. 13 is a simplified block diagram of at least one embodiment of a managed node of the system of FIG. 12.

Referring now to FIG. 13, the managed node 1250 in the set of managed nodes 1260 may be embodied as any type of compute device capable of performing the functions described herein, including decompressing data, compressing data, reading data, writing data, transmitting data, and performing workloads. For example, the managed node 1250 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1250 includes a central processing unit (CPU) 1302, a main memory 1304, an input/output (I/O) subsystem 1306, communication circuitry 1308, and one or more data storage devices 1314. Of course, in other embodiments, the managed node 1250 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 may include specialized tree logic 1318, which may be embodied as any circuitry or device capable of offloading, from the other components of the CPU 1302, the parsing of tree descriptors and the generation of trees and corresponding tables for use in entropy encoding and decoding. Furthermore, in the illustrative embodiment, the tree logic 1318 may include a cache memory 1320 which may be embodied as any circuitry or device capable of caching (e.g., temporarily storing for fast access) tags indicative of tree descriptors, corresponding trees and tables, and metadata (e.g., a timestamp indicative of a last time a particular tree was used, for use in managing a cached set of the trees, etc.). Additionally or alternatively, the cache memory 1320 may be included in the main memory 1304. As discussed above, the managed node 1250 may include resources distributed across multiple sleds and in such embodiments, the CPU 1302 may include portions thereof located on the same sled or different sled.

The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as compressed data, cached decompression data (e.g., cached tree data), decompressed data, operating systems, applications, programs, libraries, and drivers. As discussed above, the main memory 1304 may include the cache memory 1320 for use in caching tree descriptors, corresponding trees and tables, and metadata (e.g., a last time a particular tree was used, etc.). The managed node 1250 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1250. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1250, on a single integrated circuit chip.

The communication circuitry 1308 may be embodied as any communication circuit, device, or collection thereof, capable of enabling communications over the network 1230 between the managed node 1250 and another compute device (e.g., the orchestrator server 1240 and/or one or more other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the managed node 1250 to connect with another compute device (e.g., the orchestrator server 1240 and/or physical resources of one or more managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a processor (not shown) local to the NIC 1310. In such embodiments, the local processor of the NIC 1310 may be capable of performing one or more of the functions of the CPU 1302 described herein. As discussed above, the managed node 1250 may include resources distributed across multiple sleds and in such embodiments, the communication circuitry 1308 may include portions thereof located on the same sled or different sled.

The one or more illustrative data storage devices 1314, may be embodied as any type of devices configured for short-term or long-term storage of data such as, for example, solid-state drives (SSDs), hard disk drives, memory cards, and/or other memory devices and circuits. Each data storage device 1314 may include a system partition that stores data and firmware code for the data storage device 1314. Each data storage device 1314 may also include an operating system partition that stores data files and executables for an operating system. In the illustrative embodiment, each data storage device 1314 includes non-volatile memory. Non-volatile memory may be embodied as any type of data storage capable of storing data in a persistent manner (even if power is interrupted to the non-volatile memory). For example, in the illustrative embodiment, the non-volatile memory is embodied as Flash memory (e.g., NAND memory or NOR memory). In other embodiments, the non-volatile memory may be embodied as any combination of memory devices that use chalcogenide phase change material (e.g., chalcogenide glass), or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque (STT)-MRAM, multi-threshold level NAND memory, a resistive memory, anti-ferroelectric memory, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Additionally, the managed node 1250 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

The client device 1220, the orchestrator server 1240, and the other managed nodes 1260 may have components similar to those described in FIG. 13. The description of those components of the managed node 1250 is equally applicable to the description of components of the client device 1220, the orchestrator server 1240, and the other managed nodes 1260 and is not repeated herein for clarity of the description. Further, it should be appreciated that any of the client device 1220, the orchestrator server 1240, and the other managed nodes 1260 may include other components, sub-components, and devices commonly found in a computing device, which are not discussed above in reference to the managed node 1250 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
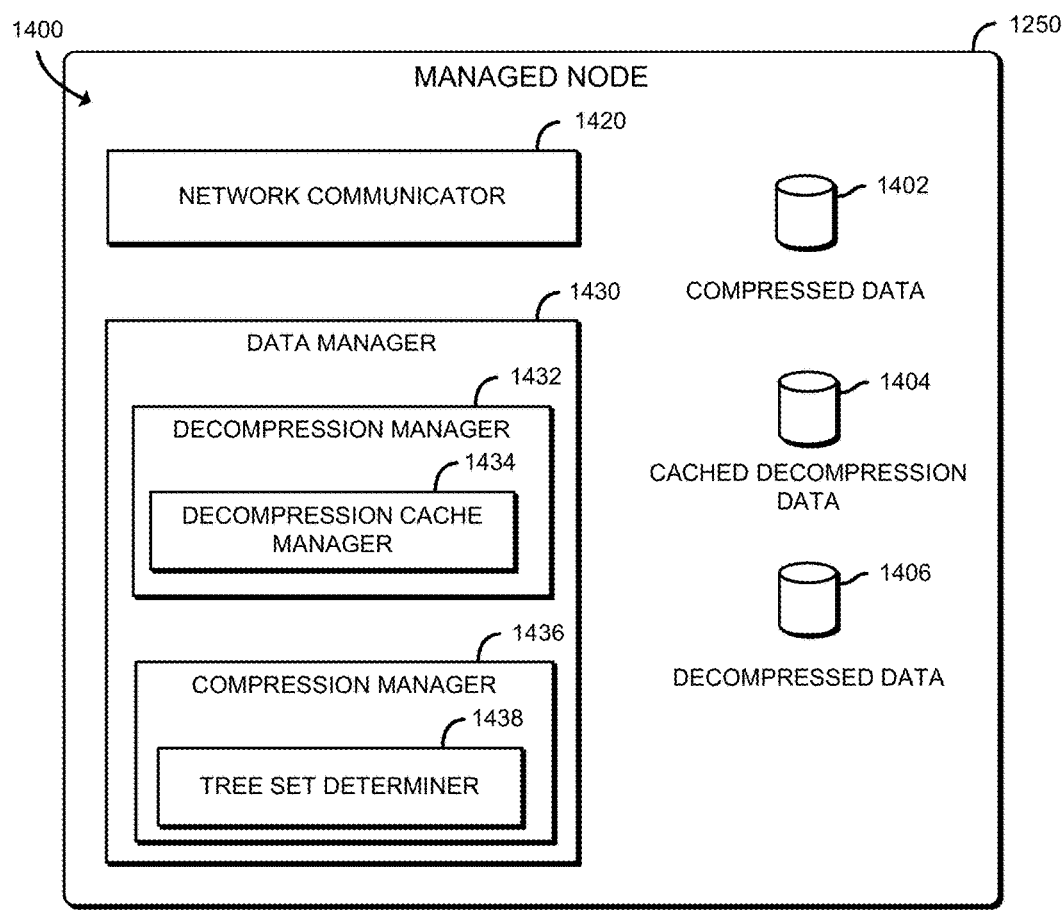
FIG. 14 is a simplified block diagram of at least one embodiment of an environment that may be established by a managed node of FIGS. 12 and 13.

Referring now to FIG. 14, in the illustrative embodiment, the managed node 1250 may establish an environment 1400 during operation. The illustrative environment 1400 includes a network communicator 1420 and a data manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, data manager circuitry 1430, etc.). It should be appreciated that, in such embodiments, one or more of the network communicator circuitry 1420 or the data manager circuitry 1430 may form a portion of one or more of the CPU 1302, the main memory 1304, the communication circuitry 1308, the I/O subsystem 1306, and/or other components of the managed node 1250. In the illustrative embodiment, the environment 1400 includes compressed data 1402 which may be embodied as any data (e.g., data blocks) compressed with entropy encoding. The data may have been received from another device (e.g., the client device 1220, the orchestrator server 1240, one or more resources of another managed node 1260) or generated by the present managed node 1260. The compressed data 1402 may be embodied as a collection of different files or streams of different types of data, such as log data (e.g., error messages, internet protocol addresses, media access control addresses, etc.), metadata (e.g., descriptions of attributes images, files, etc.), and/or genome data (e.g., A, C, G, and T symbols representing nucleotide bases). As described in more detail herein, each type of data in the compressed data 1402 may use certain symbols more frequently than other symbols and, as such, may be compressed with a corresponding set of trees that, compared to other sets of trees, result in higher compression ratios (i.e., the ratio of decompressed size to the compressed size). The environment 1400, in the illustrative embodiment, additionally includes cached decompression data 1404, which may be embodied as any data indicative of cached tree descriptors and metadata, as well as the corresponding trees and tables generated from parsing the tree descriptors. As described herein, the cached decompression data 1404, in the illustrative embodiment, is produced by the present managed node 1260 while decompressing a stream of the compressed data 1402. Additionally, in the illustrative embodiment, the environment 1400 includes decompressed data 1406 which may be embodied as any data that has been decompressed from the compressed data 1402 and/or data that has not yet been compressed.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1250. To do so, the network communicator 1420 is configured to receive and process data packets from one system or computing device (e.g., the orchestrator server 1240, a managed node 1260, etc.) and to prepare and send data packets to another computing device or system (e.g., another managed node 1260). Accordingly, in some embodiments, at least a portion of the functionality of the network communicator 1420 may be performed by the communication circuitry 1308, and, in the illustrative embodiment, by the NIC 1310.

The data manager 1430, which may be embodied as hardware, firmware, software, virtualized hardware, emulated architecture, and/or a combination thereof as discussed above, is configured to manage the decompression and compression of data. To do so, in the illustrative embodiment, the data manager 1430 includes a decompression manager 1432 and a compression manager 1436. The decompression manager 1432, in the illustrative embodiment, is configured to receive compressed data (e.g., a stream of the compressed data 1402), sequentially decompress blocks of the compressed data 1402, and cache and reuse tree data during the decompression process. To do so, in the illustrative embodiment, the decompression manager 1432 includes a decompression cache manager 1434. In the illustrative embodiment, the decompression cache manager 1434 is configured to determine whether a tree descriptor of a present block of compressed data matches (e.g., includes the same sequence of values as) a tree descriptor (e.g., a variable length string of bits indicative of codes and corresponding symbols) present in the cached decompression data and if so, retrieve the corresponding data structures (e.g., the tree(s) and table(s)) for use in decompressing the block. Alternatively, if the tree descriptor does not match a tree descriptor in the cached decompression data 1404, the decompression cache manager 1434, in the illustrative embodiment, is configured to store tree(s) generated from parsing the tree descriptor and the table(s) generated from the tree(s) in association with a tag that includes the tree descriptor and associated metadata (e.g., a timestamp of when the corresponding tree(s) and table(s) were last used to decompress data).

The compression manager 1436, in the illustrative embodiment, is configured to compress data (e.g., decompressed data 1406) using entropy encoding (e.g., Huffman encoding). In some embodiments, the compression manager 1436 may use additional compression schemes, such as run length encoding, a Lempel-Ziv compression scheme, or other compression scheme to further compress the data. Additionally, in the illustrative embodiment, in performing the entropy encoding, the compression manager 1436 is configured to utilize a set of trees that is tailored to a type of the data to be compressed, to provide higher compression ratios than would otherwise be provided. To do so, in the illustrative embodiment, the compression manager 1436 includes a tree set determiner 1438. In the illustrative embodiment, the tree set determiner 1438 is configured to analyze a collection of decompressed data (e.g., decompressed data 1406) of a particular type (e.g., log data, metadata, genome data, etc.), determine a set of trees (e.g., a threshold number of trees that would typically fit within the cache memory 1320) that result in a higher compression ratio than other sets of trees for that data type, and, when another set of data of the same type is being compressed by the compression manager 1436, provide the corresponding set of trees to the compression manager 1436 to perform the entropy encoding. The tree set determiner 1438, in the illustrative embodiment, is configured to generate sets of trees for multiple types of data (e.g., a tree set for log data, another tree set for metadata, another tree set for genome data, etc.).

It should be appreciated that each of the decompression manager 1432, the decompression cache manager 1434, the compression manager 1436, and the tree set determiner 1438 may be separately embodied as hardware, firmware, software, virtualized hardware, emulated architecture, and/or a combination thereof and may be distributed across multiple sleds. For example, the decompression manager 1432 may be embodied as a hardware component, while the decompression cache manager 1434, the compression manager 1436, and the tree set determiner 1438 are embodied as virtualized hardware components or as some other combination of hardware, firmware, software, virtualized hardware, emulated architecture, and/or a combination thereof.

Figure 15:
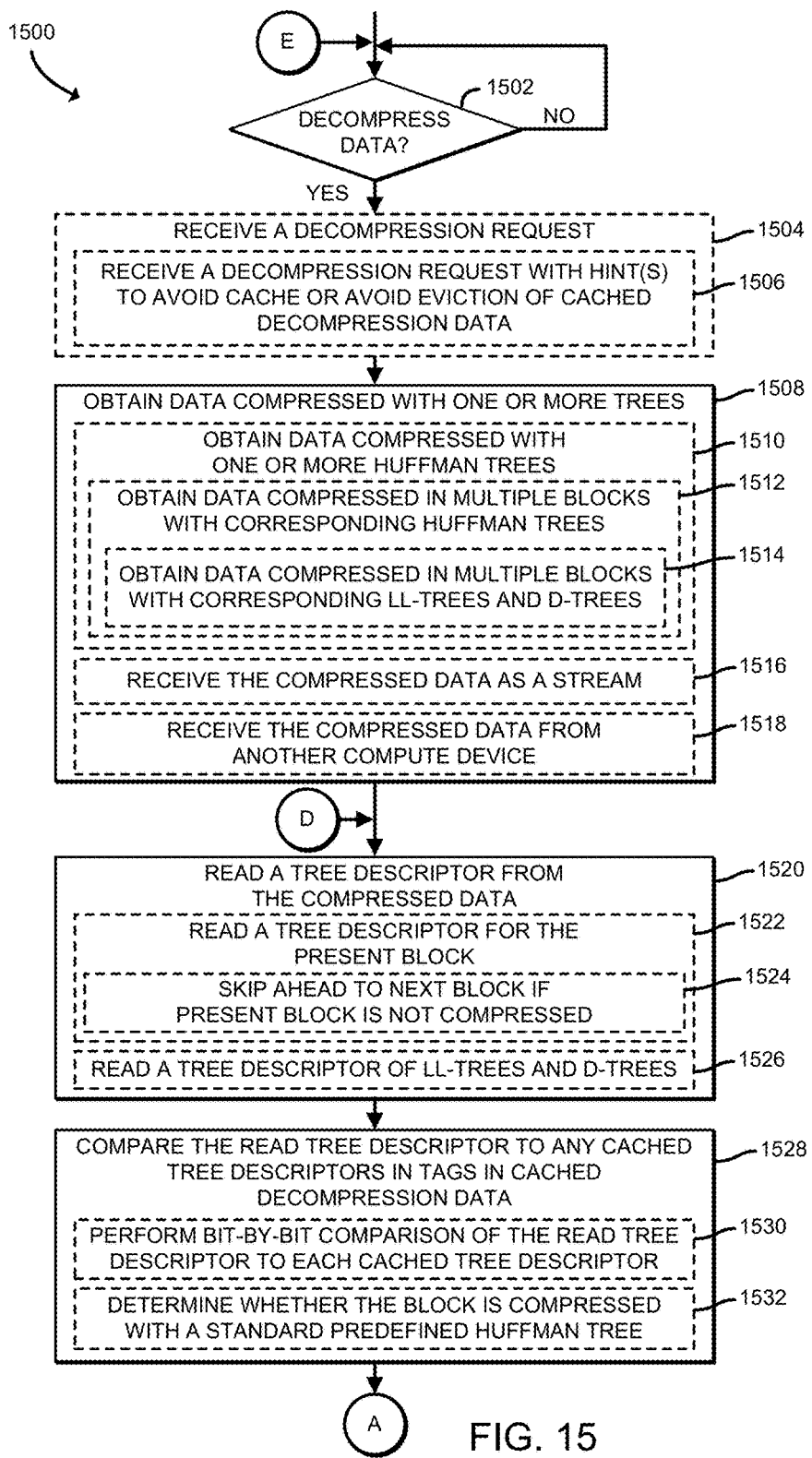
FIGS. 15-17 are a simplified flow diagram of at least one embodiment of a method for performing low-latency decompression that may be performed by a managed node of FIGS. 12-14.

Referring now to FIG. 15, in use, the managed node 1250 may execute a method 1500 for performing low-latency decompression of data. The method 1500 begins with block 1502, in which the managed node 1250 determines whether to decompress data. In the illustrative embodiment, the managed node 1250 may determine to decompress data if the managed node 1250 is powered on. In other embodiments, the managed node 1250 may determine to decompress data based on other factors (e.g., if the managed node 1250 has been assigned a workload that includes decompression tasks, etc.). Regardless, in response to a determination to decompress data, the method 1500 advances to block 1504 in which the managed node 1250 may receive a decompression request (i.e., a request to decompress data), such as from another resource of the managed node 1250 (e.g., from a physical compute resource 205-4, a physical storage resource 205-1) or from another compute device (e.g., the orchestrator server 1240, the client device 1220, etc.). In doing so, the managed node 1250 may receive a decompression request that includes one or more hints to avoid caching or avoid eviction of certain decompression data, as indicated in block 1506. For example, the decompression request may include metadata that includes an identifier (e.g., a sequence number, a tree descriptor, etc.) for one or more data blocks for which the decompression data (e.g., tree descriptor, trees, tables, etc.) is not to be cached (e.g., temporarily stored in the cache memory 1320 for quick reference).

In block 1508, the managed node 1250 obtains data that has been compressed with one or more trees (e.g., the compressed data 402). The trees may be embodied as any data indicative of codes associated with symbols in the data and in which more frequently occurring symbols have shorter codes than less frequently occurring symbols. As indicated in block 1510, the managed node 1250 may obtain data compressed with one or more Huffman trees. Further, in the illustrative embodiment, the managed node 1250 may obtain data compressed in multiple blocks with corresponding Huffman trees, as indicated in block 1512. Additionally, as indicated in block 1514, the managed node 1250 may obtain data compressed in multiple blocks with corresponding literal-length trees (LL-trees) and distance trees (D-trees), such as data encoded with the Deflate compression scheme. In the illustrative embodiments, the LL-trees may embodied as any data indicative of codes associated with literal symbols and length symbols, in which the more frequently occurring literal or length symbols have shorter codes and the less frequently occurring literal or length symbols have longer codes. Similarly, the D-trees may be embodied as any data indicative of codes associated with distance symbols, in which the more frequently occurring distance symbols have shorter codes and the less frequently occurring symbols have longer codes. In such embodiments, the data is compressed with literal bytes, represented by literal symbols, and pointers to replicated strings, in which each pointer is a pair of a length (i.e., a length symbol) and a backward distance offset (i.e., a distance offset indicative of a number of bytes from the previous occurrence of the replicated string). As indicated in block 1516, the managed node 1250 receives the compressed data 1402 in a stream. Further, as indicated in block 1518, the managed node 1250 may receive the compressed data 1402 from another compute device (e.g., the client device 1220, the orchestrator server 1240, etc.). In other embodiments, the managed node 1250 may obtain the compressed data 1402 from one of its own resources (e.g., one or more physical storage resources 205-1 and/or one or more physical memory resources 205-3).

Subsequently, in block 1520, the managed node 1250 reads a tree descriptor from the compressed data 1402. In the illustrative embodiment, a tree descriptor is a variable length sequence of values indicative of a structure of one or more trees (e.g., a Huffman tree, an LL-tree, a D-tree, etc.). As indicated in block 1522, the managed node 1250 reads a tree descriptor corresponding to the present block (e.g., the first block of the stream). In some embodiments, one or more blocks of the stream may be uncompressed. If the tree descriptor (e.g., a section of a header of the present block) indicates that the present block is not compressed, the managed node 1250 skips ahead to the next block in the stream, as indicated in block 1524. In block 1526, in reading the tree descriptor, the managed node 1250 may read a tree descriptor for an LL-tree and/or a D-tree (e.g., for data that was compressed with the Deflate compression scheme).

Afterwards, the method 1500 advances to block 1528, in which the managed node 1250 compares the tree descriptor that was read in block 1520 to any cached tree descriptors in tags in the cached decompression data 1404. Initially, the cached decompression data 1404 may be empty or otherwise not contain any tags with tree descriptors that match the tree descriptor read in block 1520. In later iterations, the cached decompression data 1404 may accumulate tags that include tree descriptors that were encoded in earlier blocks of the compressed data 1402. In comparing the read tree descriptor to any cached tree descriptors in the cached decompression data 1404, the managed node 1250 may perform a bit-by-bit comparison of the read tree descriptor and each cached tree descriptor, as indicated in block 1530. It is also possible that the present block was encoded with a standard, predefined Huffman tree, rather than a tree that was generated as a function of the frequencies of the symbols in the present block. The tree descriptor may include an indicator that the present block was encoded using the standard, predefined tree. In the illustrative embodiment, the standard, predefined tree and the associated tables are permanently encoded in the tree logic 1318 and/or present in memory (e.g., the main memory 1304 and/or the cache memory 1320). As indicated in block 1532, the managed node 1250 may determine whether the present block is compressed with the standard predefined Huffman tree (e.g., by detecting a flag or other indicator of the standard predefined tree in the tree descriptor or header of the present data block). Subsequently, the method 1500 advances to block 1534 of FIG. 16, in which the managed node 1250 determines whether the present data block was compressed with a cached tree or the standard, predefined tree. If not, the method 1500 advances to block 1536, in which the managed node 1250 parses the tree descriptor to construct one or more corresponding tables. Each table may be embodied as any data indicative of the codes and corresponding symbols from the tree or trees used to encode the data block. As indicated in block 1538, in parsing the tree descriptor, the managed node 1250 may parse a tree descriptor to construct an LL-table (e.g., data indicative of literal and length symbols and their corresponding codes) and a D-table (e.g., data indicative of distance symbols and their corresponding codes).

Subsequently, in block 1540, the managed node 1250 stores, in the cached decompression data 1404 (e.g., in the cache memory 1320), a tag (e.g., data) indicative of the tree descriptor and the one or more tables that were constructed in block 1536. In doing so, the managed node 1250 may store the LL-table and exclude the D-table from the cached decompression data 1404, as indicated in block 1542. Additionally, the managed node 1250 may evict another tag and the corresponding table(s) from the cached decompression data 1404, as indicated in block 1544. In doing so, and as indicated in block 1546, the managed node 1250 may evict the tag and table(s) as a function of the available cache capacity (e.g., the amount of available memory in the cache memory 1320) and/or as a function of the size of the tag and the corresponding tables, as indicated in block 1548. For example, if the tag and table(s) to be cached satisfy a predefined threshold size and/or will not fit within the available unused space in the cache memory 1320, the managed node 1250 may evict (e.g., remove) a tag and associated tables. As indicated in block 1550, the managed node 1250 may evict a tag and the associated table(s) as a function of a least recently used scheme (e.g., evict the least recently used tag and corresponding table(s)), as a function of a first in, first out scheme (e.g., evict the oldest tag and tables from the cache memory 1320), or other scheme. Further, as indicated in block 1552, the managed node 1250 may evict the tag and corresponding table(s) as a function of one or more hints included in the request received in block 1504 of FIG. 15. As such, the managed node 1250 may determine to maintain a particular tag and corresponding table(s) in the cached decompression data when that tag and table(s) would otherwise be evicted.

After storing the tag and the one or more tables in the cached decompression data 1404, the method 1500 advances to block 1554 in which the managed node 1250 selects the one or more tables constructed in block 1540 to decompress the compressed data. In doing so, in the illustrative embodiment in which the compressed data is embodied as multiple blocks, the managed node 1250 selects the constructed table(s) to decompress the present data block, as indicated in block 1556. Subsequently, the method 1500 advances to block 1566 of FIG. 17, in which the managed node 1250 decompresses the compressed data with the selected table(s).

Figure 16:
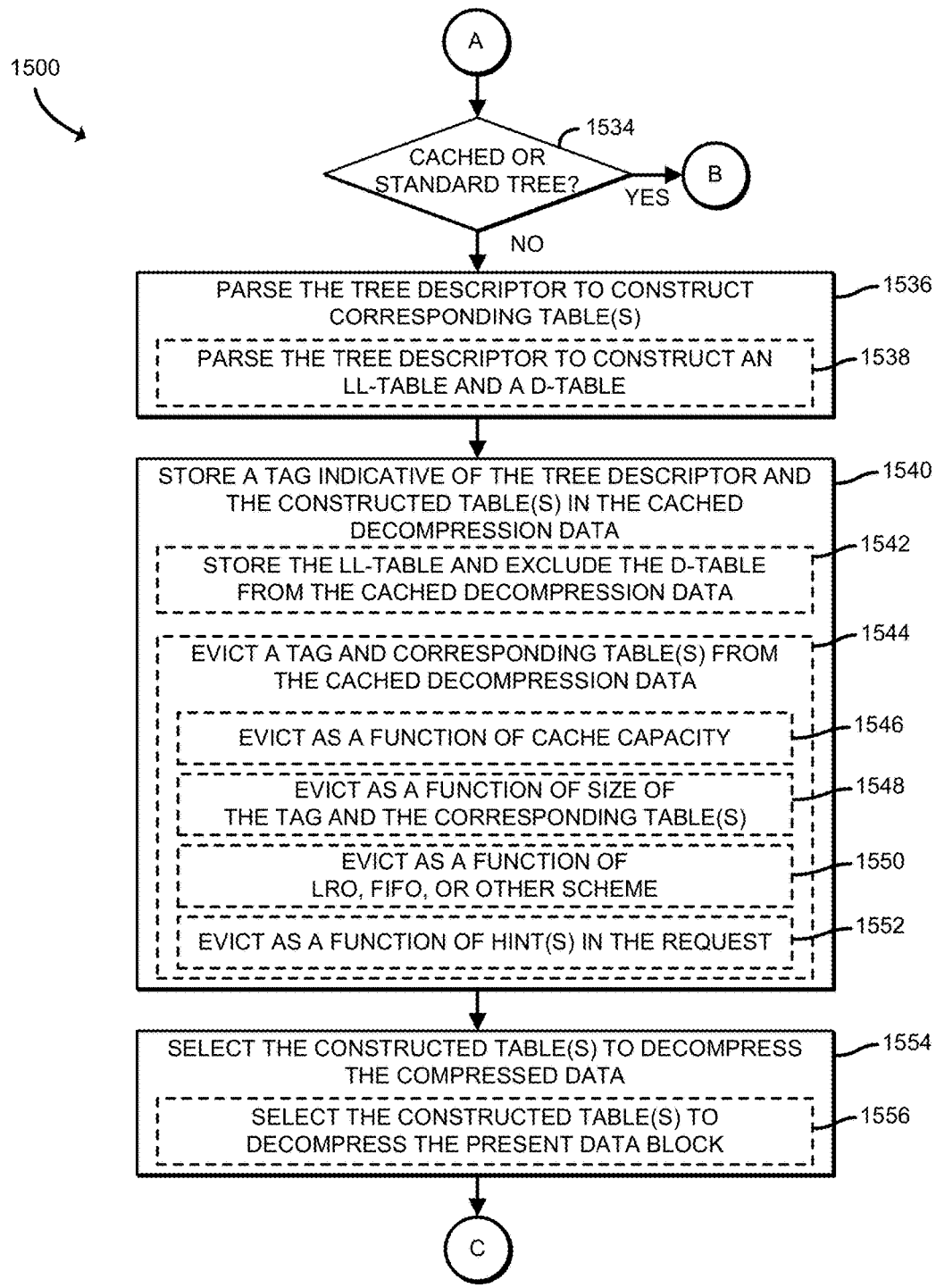
Figure 17:
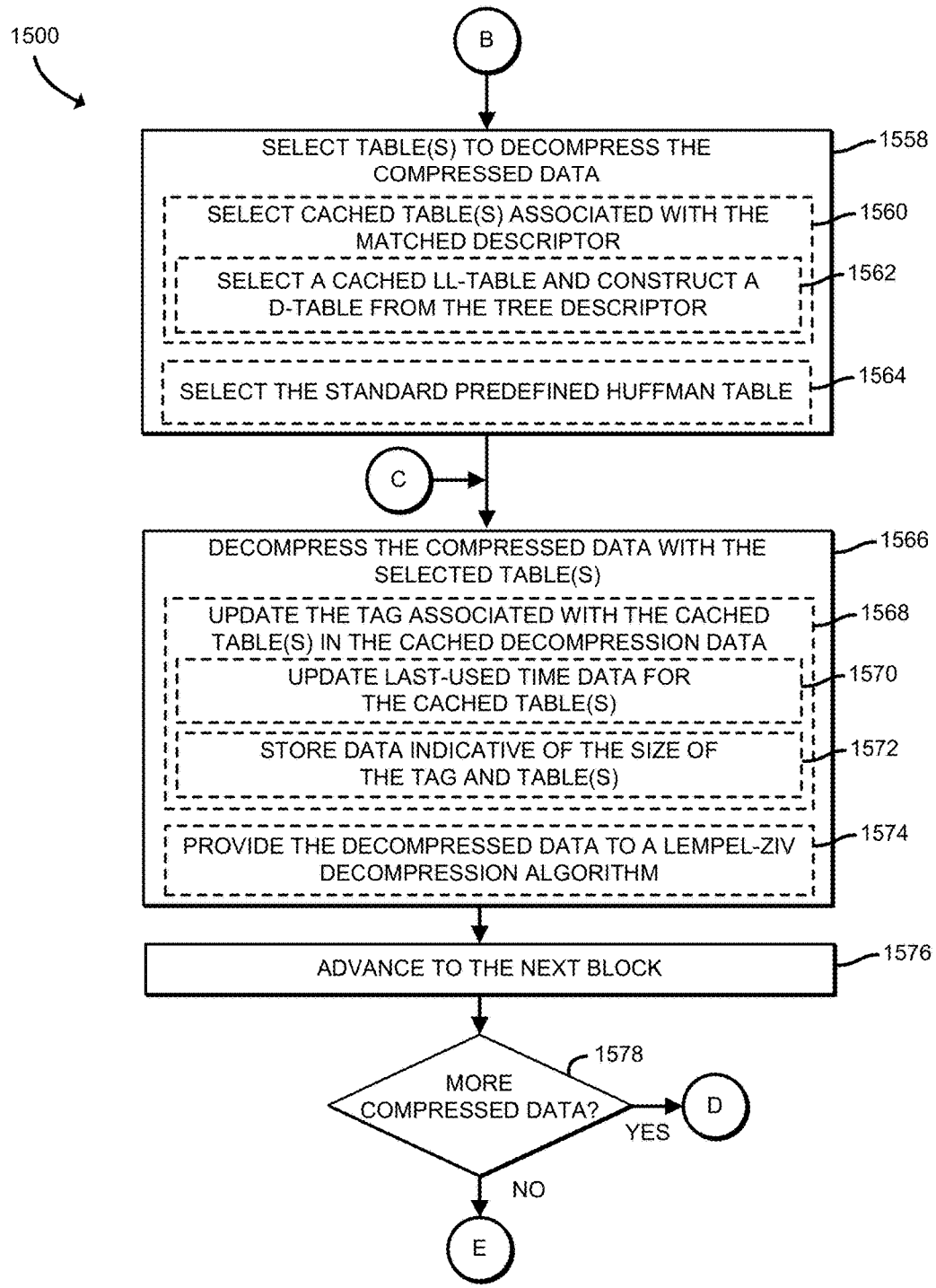

Referring back to block 1534 of FIG. 16, if the compressed data 1402 is compressed with a cached tree or the predefined standard tree, the method 1500 advances to block 1558 of FIG. 17, in which the managed node 1250 selects the corresponding tables to decompress the compressed data 1402. In doing so, the managed node 1250 may selected one or more cached tables associated with the matched tree descriptor, as indicated in block 1560. Further, as indicated in block 1562, the managed node 1250 may select a cached LL-table and construct a D-table from the tree descriptor (e.g., if the corresponding D-table was not cached). Alternatively, as indicated in block 1564, the managed node 1250 may select the standard predefined table (e.g., a standard predefined Huffman table), if the managed node 1250 determined, in block 1532 of FIG. 15, that the compressed data 1402 was compressed with the standard predefined table. Subsequently, the method 1500 advances to block 1566, in which the managed node 1250 decompresses the compressed data 1402 with the selected table(s), as briefly described above.

In decompressing the compressed data 1402 with the selected table(s), the managed node may update the tag associated with the cached table(s) in the cached decompression data 1404, as indicated in block 1568. In doing so, the managed node 1250 may update data indicative of the last time the table(s) associated with the tag were used (e.g., the present time), as indicated in block 1570. Additionally or alternatively, the managed node 1250 may store data indicative of the size of the tree descriptor and corresponding table(s) (e.g., to help in efficiently determining whether to evict the tag and tables to provide capacity for another tag and table(s) at a later time), as indicated in block 1572. As indicated in block 1574, the managed node 1250 may provide the decompressed data to another decompression algorithm, such as a Lempel-Ziv decompression algorithm.

Subsequently, as indicated in block 1576, the method 1500 advances in the compressed data to a next data block, if a next data block exists. In block 1578, the managed node 1250 determines whether more compressed data is present (e.g., there is a next data block in the compressed data 1402). If so, the method 1500 loops back to block 1520 of FIG. 15, in which the managed node 1250 reads another tree descriptor from the compressed data 1404 (e.g., the tree descriptor in the next data block). Otherwise, the method 1500 loops back to block 1502, in which the managed node 1250 again determines whether to decompress data.

Figure 18:
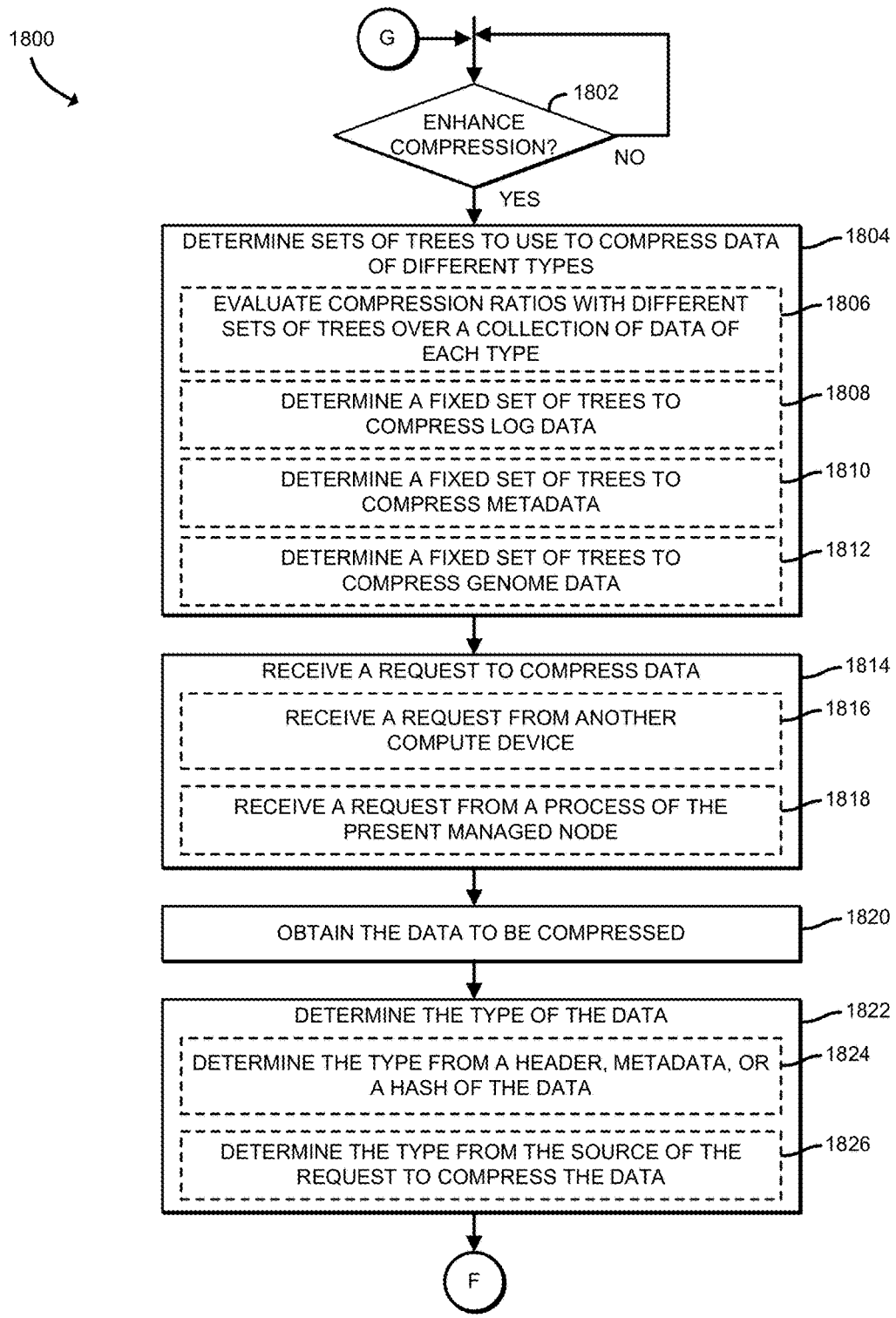
FIGS. 18-19 are a simplified flow diagram of at least one embodiment of a method for performing enhanced compression of data that may be performed by a managed node of FIGS. 12-14.

Referring now to FIG. 18, in use, the managed node 1250 may execute a method 1800 for performing enhanced compression of data (e.g., to enable low-latency decompression of the data pursuant to the method 1500 described above). The method 1800 begins with block 1802 in which the managed node 1250 determines whether to perform enhanced compression of data. In the illustrative embodiment, the managed node 1250 may determine to perform enhanced compression of data if the managed node 1250 is powered on. In other embodiments, the managed node 1250 may determine whether to perform enhanced compression of data based on other factors such as the availability of reference data to be used to determine sets of trees for different types of data, as explained in more detail herein, and/or other factors. Regardless, in response to a determination to perform enhanced compression, the method advances to block 1804 in which the managed node 1250 determines sets of trees to use to compress data of different types.

In determining the sets of trees, the managed node 1250 may evaluate compression ratios with different sets of trees over a collection of data (e.g., reference data) of each of multiple different types, as indicated in block 1806. For example, and as indicated in block 1808, the managed node 1250 may determine a fixed set of trees to compress log data (e.g., a set of trees that result in a higher compression ratio than other trees, when compressing log data). Additionally or alternatively, the managed node 1250 may determine a fixed set of trees to compress metadata, as indicated in block 1810. The managed node 1250 may additionally or alternatively determine a fixed set of trees to compress genome data, as indicated in block 1812. In other embodiments, the managed node 1250 may determine fixed sets of trees for other types of data. The trees may be different for each data type, as the frequencies of particular symbols may differ more between data types than within a given data type.

Figure 19:
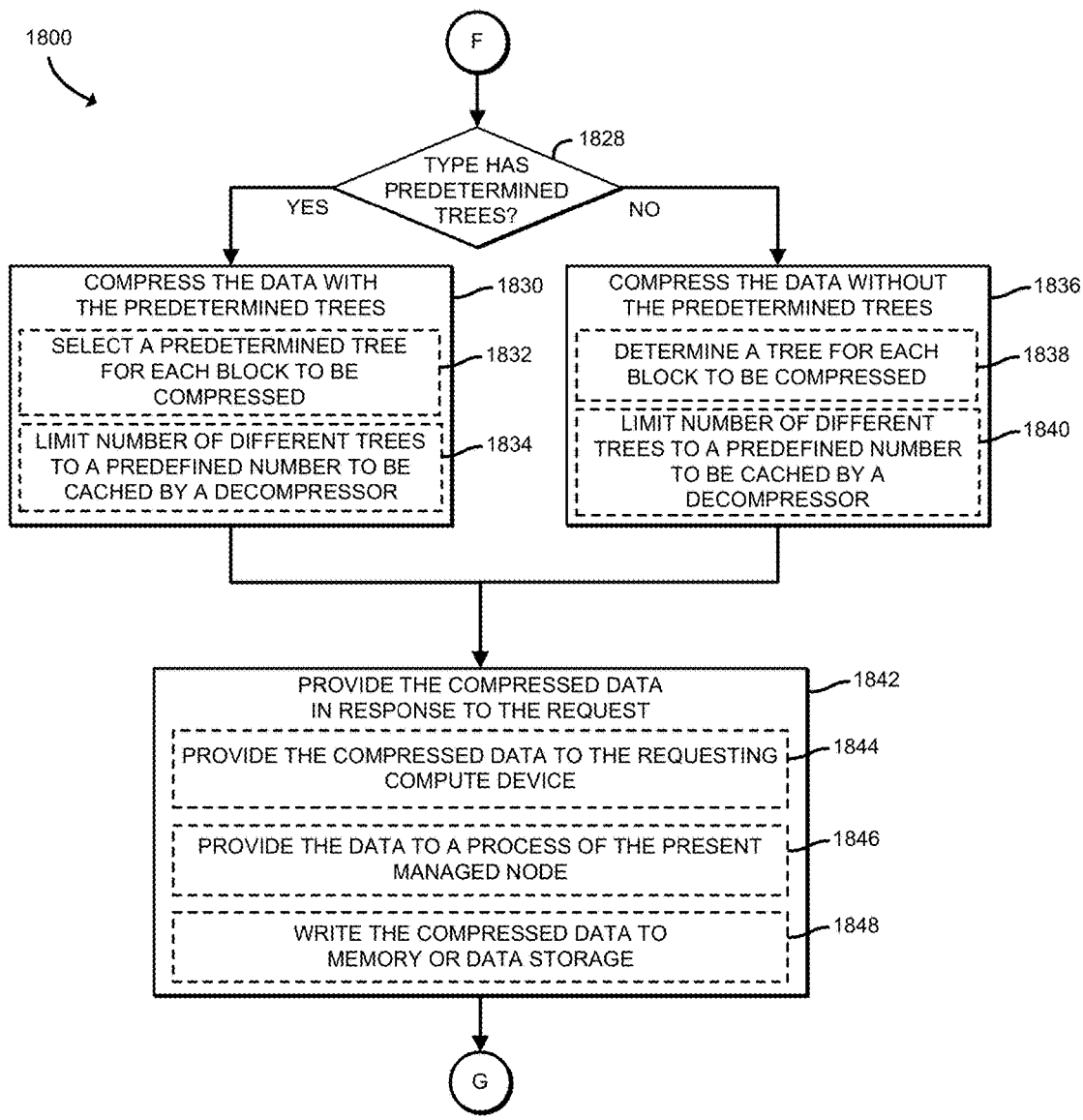

Afterwards, the method 1800 advances to block 1814, in which the managed node 1250 receives a request to compress data. In doing so, the managed node 1250 may receive a request from another compute device (e.g., the client device 1220 or the orchestrator server 1240), as indicated in block 1816. Alternatively, the managed node 1250 may receive the request from a resource of the present managed node 1260, such from a process executed by a resource (e.g., a physical compute resource 205-1) of the present managed node 1260, as indicated in block 1818. In block 1820, the managed node 1250 obtains the data to be compressed, such as by receiving the data from the requesting compute device (e.g., the client device 1220 or the orchestrator server 1240) or by reading the data from a physical storage resource 205-1 of the present managed node 1260. Subsequently, the method 1800 advances to block 1822 in which the managed node 1250 determines the type of the data that was obtained in block 1820. In doing so, the managed node 1250 may determine the type from a header or metadata of the obtained data that indicates the type of the data, and/or from a hash of the data, which may be cross referenced with one or more reference hashes associated with known types of data (e.g., log data, metadata, genome data, etc.), as indicated in block 1824. Additionally or alternatively, the managed node 1250 may determine the type of the obtained data based on the source of the request to compress the data, as indicated in block 1826. For example, the managed node 1250 may store a table or other data structure that correlates internet protocol addresses, media access control addresses, process identifiers, and/or other identifiers of compute devices, resources, and/or processes with data types, and determine the data type as a function of the identifier of the source of the request (e.g., as an index into the table or other data structure). Subsequently, the method 1800 advances to block 1828 of FIG. 19, in which the managed node 1250 determines whether the data type determined in block 1822 has a set of predetermined trees associated with it (e.g., a set of trees that was determined in block 1804). If so, the method 1800 advances to block 1830, in which the managed node 1250 compresses the data with the predetermined trees. In doing so, the managed node 1250 may select one of the predetermined trees for each block to be compressed (e.g., the tree that provides the highest compression ratio), as indicated in block 1832. Further, as indicated in block 1834, the managed node 1250 may limit the number of different trees from the predetermined set to a predefined number to be cached by a decompressor (e.g., the managed node 1250, another managed node 1260, or other compute device that is to decompress the data). In some embodiments, the set of trees is already limited to the predefined number of trees, while in other embodiments, the set includes more than the predefined amount, and the managed node 1250 limits the amount to the predefined number, to reduce the number of cache misses and to prevent tags and data from being evicted as a function of the available capacity of the cache memory 1320 of the decompressor.

Referring back to block 1828, if the data type does not have a set of predetermined trees, the method 1800 advances to block 1836 in which the managed node 1250 compresses the data without predetermined trees. In doing so, and as indicated in block 1838, the managed node 1250 determines a tree for each block to be compressed. Further, as indicated in block 1840, the managed node may limit the number of different trees to the predefined number to be cached by a decompressor. Accordingly, after the managed node 1250 has generated a threshold number of trees while compressing the data, the managed node 1250 may reuse the determined trees for subsequent data blocks, rather than generating any more trees.

After the data is compressed, the method 1800 advances to block 1842, in which the managed node 1250 provides the compressed data 1402 in response to the request received in block 1814. In doing so, the managed node 1250 may provide the compressed data to the requesting compute device (e.g., the client device 1220, the orchestrator server 1240, etc.), as indicated in block 1844 or may provide the compressed data to a process of the present managed node 1260, as indicated in block 1846. As indicated in block 1848, in providing the compressed data, the managed node 1250 may write the compressed data 1402 to memory (e.g., the memory 1304) and/or to data storage (e.g., the one or more data storage devices 1314). Subsequently, the method 1800 returns to block 1802 in which the managed node 1250 again determines whether to perform enhanced data compression.

EXAMPLES

Illustrative examples of the technologies disclosed herein are provided below. An embodiment of the technologies may include any one or more, and any combination of, the examples described below.

Example 1 includes a managed node for efficiently decompressing data, the managed node comprising a cache memory; and a data manager to parse, in response to a determination that a read tree descriptor does not match a cached tree descriptor, the read tree descriptor to construct one or more tables indicative of codes in compressed data, wherein each code corresponds to a different symbol; decompress the compressed data with the one or more tables; and store the one or more tables in association with the read tree descriptor in the cache memory for subsequent use.

Example 2 includes the subject matter of Example 1, and wherein the data manager is further to obtain the compressed data, wherein the data is compressed with one or more trees indicative of frequencies of the symbols in an uncompressed form of the data; read a tree descriptor from the compressed data, wherein the tree descriptor is a variable length sequence of values indicative of a structure of the one or more trees; and determine whether the read tree descriptor matches a cached tree descriptor in the cache memory.

Example 3 includes the subject matter of any of Examples 1 and 2, and wherein the data manager is further to select, in response to a determination that the read tree descriptor matches a cached tree descriptor, one or more tables stored in the cache memory in association with the cached tree descriptor; and decompress the compressed data with the selected one or more tables.

Example 4 includes the subject matter of any of Examples 1-3, and wherein to obtain the compressed data comprises to obtain data compressed with one or more Huffman trees.

Example 5 includes the subject matter of any of Examples 1-4, and wherein to obtain the compressed data comprises to obtain data in multiple blocks compressed with a literal-length tree indicative of codes that correspond with literal symbols and length symbols, and a distance tree indicative of codes that correspond with distance symbols.

Example 6 includes the subject matter of any of Examples 1-5, and wherein to parse the descriptor comprises to construct a literal-length table indicative of codes that correspond to the literal symbols and length symbols, and a distance table indicative of codes that correspond to the distance symbols.

Example 7 includes the subject matter of any of Examples 1-6, and wherein to store the one or more tables comprises to store the literal-length table in the cache memory and exclude the distance table from the cache memory.

Example 8 includes the subject matter of any of Examples 1-7, and wherein to store the one or more tables comprises to store a tag indicative of the tree descriptor and the one or more constructed tables in the cache memory.

Example 9 includes the subject matter of any of Examples 1-8, and wherein to the store the tag further comprises to determine whether to evict at least one other tag and the associated one or more tables from the cache memory as a function of a capacity of the cache memory.

Example 10 includes the subject matter of any of Examples 1-9, and wherein to obtain the compressed data comprises to obtain the compressed data in response to receipt of a request that includes one or more hints indicative of whether to retain one or more tags and associated tables in the cache memory; and wherein to the store the tag further comprises to determine whether to evict at least one other tag and the associated one or more tables from the cache memory as a function of the one or more hints.

Example 11 includes the subject matter of any of Examples 1-10, and wherein the data manager is further to store time data indicative of the last time the one or more cached tables associated with the tag were used to decompress data.

Example 12 includes the subject matter of any of Examples 1-11, and wherein the data manager is further to provide the decompressed data to a Lempel-Ziv decompression algorithm.

Example 13 includes the subject matter of any of Examples 1-12, and wherein the compressed data is compressed into multiple blocks and to read a tree descriptor from the compressed data comprises to read a first tree descriptor for a first block; and to store the one or more tables in association with the read tree descriptor comprises to store the one or more tables in association with the first tree descriptor; and the data manager is further to read a second tree descriptor for a second block in the compressed data; and determine whether the second tree descriptor matches the first tree descriptor.

Example 14 includes the subject matter of any of Examples 1-13, and wherein to determine whether the read tree descriptor matches a cached tree descriptor in the cache memory comprises to perform a bit-by-bit comparison of the read tree descriptor to one or more cached tree descriptors.

Example 15 includes the subject matter of any of Examples 1-14, and wherein to obtain the compressed data comprises to obtain a stream of compressed blocks of data.

Example 16 includes the subject matter of any of Examples 1-15, and wherein the data manager is further to determine a set of trees to use to compress data of different types; the managed node further comprises a network communicator to receive a request to compress data; and the data manager is further to obtain the data to be compressed; determine the type of the obtained data; and compress the obtained data with one or more of the determined trees associated with the determined type of the obtained data.

Example 17 includes the subject matter of any of Examples 1-16, and wherein to determine a set of trees to use to compress data of different types comprises to evaluate compression ratios with different sets of trees for each of multiple types of data.

Example 18 includes the subject matter of any of Examples 1-17, and wherein to determine a set of trees to use to compress data of different types comprises to determine a fixed set of trees to compress at least one of log data, metadata, or genome data.

Example 19 includes the subject matter of any of Examples 1-18, and wherein to determine the type of the data comprises to determine the type from at least one of a header, metadata, or a hash of the data.

Example 20 includes the subject matter of any of Examples 1-19, and wherein to determine the type of the data comprises to determine the type from a source of a request to compress the data.

Example 21 includes the subject matter of any of Examples 1-20, and wherein to compress the data with the determined set of trees comprises to limit the number of different trees used to compress the data to a predefined number to be cached by a decompressor of the compressed data.

Example 22 includes a method for efficiently decompressing data, the method comprising parsing, by a managed node and in response to a determination that a read tree descriptor does not match a cached tree descriptor, the read tree descriptor to construct one or more tables indicative of codes in compressed data, wherein each code corresponds to a different symbol; decompressing, by the managed node, the compressed data with the one or more tables; and storing, by the managed node, the one or more tables in association with the read tree descriptor in the cache memory for subsequent use.

Example 23 includes the subject matter of Example 22, and further including obtaining, by the managed node, the compressed data, wherein the data is compressed with one or more trees indicative of frequencies of symbols in an uncompressed form of the data; reading, by the managed node, a tree descriptor from the compressed data, wherein the tree descriptor is a variable length sequence of values indicative of a structure of the one or more trees; and determining, by the managed node, whether the read tree descriptor matches a cached tree descriptor in a cache memory of the managed node.

Example 24 includes the subject matter of any of Examples 22 and 23, and further including selecting, by the managed node and in response to a determination that the read tree descriptor matches a cached tree descriptor, one or more tables stored in the cache memory in association with the cached tree descriptor; and decompressing, by the managed node, the compressed data with the selected one or more tables.

Example 25 includes the subject matter of any of Examples 22-24, and wherein obtaining the compressed data comprises obtaining data compressed with one or more Huffman trees.

Example 26 includes the subject matter of any of Examples 22-25, and wherein obtaining compressed data comprises obtaining data in multiple blocks compressed with a literal-length tree indicative of codes that correspond with literal symbols and length symbols, and a distance tree indicative of codes that correspond with distance symbols.

Example 27 includes the subject matter of any of Examples 22-26, and wherein parsing the descriptor comprises constructing a literal-length table indicative of codes that correspond to the literal symbols and length symbols, and a distance table indicative of codes that correspond to the distance symbols.

Example 28 includes the subject matter of any of Examples 22-27, and wherein storing the one or more tables comprises storing the literal-length table in the cache memory and excluding the distance table from the cache memory.

Example 29 includes the subject matter of any of Examples 22-28, and wherein storing the one or more tables comprises storing a tag indicative of the tree descriptor and the one or more constructed tables in the cache memory.

Example 30 includes the subject matter of any of Examples 22-29, and wherein storing the tag further comprises determining whether to evict at least one other tag and the associated one or more tables from the cache memory as a function of a capacity of the cache memory.

Example 31 includes the subject matter of any of Examples 22-30, and wherein obtaining the compressed data comprises obtaining the compressed data in response to receipt of a request that includes one or more hints indicative of whether to retain one or more tags and associated tables in the cache memory; and wherein storing the tag further comprises determining whether to evict at least one other tag and the associated one or more tables from the cache memory as a function of the one or more hints.

Example 32 includes the subject matter of any of Examples 22-31, and further including storing, by the managed node, time data indicative of the last time the one or more cached tables associated with the tag were used to decompress data.

Example 33 includes the subject matter of any of Examples 22-32, and further including providing, by the managed node, the decompressed data to a Lempel-Ziv decompression algorithm.

Example 34 includes the subject matter of any of Examples 22-33, and wherein the compressed data is compressed into multiple blocks and reading a tree descriptor from the compressed data comprises reading a first tree descriptor for a first block; and storing the one or more tables in association with the read tree descriptor comprises storing the one or more tables in association with the first tree descriptor; and the method further comprising reading, by the managed node, a second tree descriptor for a second block in the compressed data; and determining, by the managed node, whether the second tree descriptor matches the first tree descriptor.

Example 35 includes the subject matter of any of Examples 22-34, and wherein determining whether the read tree descriptor matches a cached tree descriptor in the cache memory comprises performing a bit-by-bit comparison of the read tree descriptor to one or more cached tree descriptors.

Example 36 includes the subject matter of any of Examples 22-35, and wherein obtaining the compressed data comprises obtaining a stream of compressed blocks of data.

Example 37 includes the subject matter of any of Examples 22-36, and further including determining, by the managed node, a set of trees to use to compress data of different types; receiving, by the managed node, a request to compress data; obtaining, by the managed node, the data to be compressed; determining, by the managed node, the type of the obtained data; and compressing, by the managed node, the obtained data with one or more of the determined trees associated with the determined type of the obtained data.

Example 38 includes the subject matter of any of Examples 22-37, and wherein determining a set of trees to use to compress data of different types comprises evaluating compression ratios with different sets of trees for each of multiple types of data.

Example 39 includes the subject matter of any of Examples 22-38, and wherein determining a set of trees to use to compress data of different types comprises determining a fixed set of trees to compress at least one of log data, metadata, or genome data.

Example 40 includes the subject matter of any of Examples 22-39, and wherein determining the type of the data comprises determining the type from at least one of a header, metadata, or a hash of the data.

Example 41 includes the subject matter of any of Examples 22-40, and wherein determining the type of the data comprises determining the type from a source of a request to compress the data.

Example 42 includes the subject matter of any of Examples 22-41, and wherein compressing the data with the determined set of trees comprises limiting the number of different trees used to compress the data to a predefined number to be cached by a decompressor of the compressed data.

Example 43 includes one or more machine-readable storage media comprising a plurality of instructions stored thereon that, in response to being executed, cause a managed node to perform the method of any of Examples 22-42.

Example 44 includes a managed node for efficiently decompressing data, the managed node comprising means for parsing, in response to a determination that a read tree descriptor does not match a cached tree descriptor, the read tree descriptor to construct one or more tables indicative of codes in compressed data, wherein each code corresponds to a different symbol; means for decompressing the compressed data with the one or more tables; and means for storing the one or more tables in association with the read tree descriptor in the cache memory for subsequent use.

Example 45 includes the subject matter of Example 44, and further including means for obtaining the compressed data, wherein the data is compressed with one or more trees indicative of frequencies of symbols in an uncompressed form of the data; means for reading a tree descriptor from the compressed data, wherein the tree descriptor is a variable length sequence of values indicative of a structure of the one or more trees; and means for determining whether the read tree descriptor matches a cached tree descriptor in a cache memory of the managed node.

Example 46 includes the subject matter of any of Examples 44 and 45, and further including means for selecting, in response to a determination that the read tree descriptor matches a cached tree descriptor, one or more tables stored in the cache memory in association with the cached tree descriptor; and means for decompressing the compressed data with the selected one or more tables.

Example 47 includes the subject matter of any of Examples 44-46, and wherein the means for obtaining the compressed data comprises means for obtaining data compressed with one or more Huffman trees.

Example 48 includes the subject matter of any of Examples 44-47, and wherein the means for obtaining compressed data comprises means for obtaining data in multiple blocks compressed with a literal-length tree indicative of codes that correspond with literal symbols and length symbols, and a distance tree indicative of codes that correspond with distance symbols.

Example 49 includes the subject matter of any of Examples 44-48, and wherein the means for parsing the descriptor comprises means for constructing a literal-length table indicative of codes that correspond to the literal symbols and length symbols, and a distance table indicative of codes that correspond to the distance symbols.

Example 50 includes the subject matter of any of Examples 44-49, and wherein the means for storing the one or more tables comprises means for storing the literal-length table in the cache memory and excluding the distance table from the cache memory.

Example 51 includes the subject matter of any of Examples 44-50, and wherein the means for storing the one or more tables comprises means for storing a tag indicative of the tree descriptor and the one or more constructed tables in the cache memory.

Example 52 includes the subject matter of any of Examples 44-51, and wherein the means for storing the tag further comprises means for determining whether to evict at least one other tag and the associated one or more tables from the cache memory as a function of a capacity of the cache memory.

Example 53 includes the subject matter of any of Examples 44-52, and wherein the means for obtaining the compressed data comprises means for obtaining the compressed data in response to receipt of a request that includes one or more hints indicative of whether to retain one or more tags and associated tables in the cache memory; and wherein the means for storing the tag further comprises means for determining whether to evict at least one other tag and the associated one or more tables from the cache memory as a function of the one or more hints.

Example 54 includes the subject matter of any of Examples 44-53, and further including means for storing time data indicative of the last time the one or more cached tables associated with the tag were used to decompress data.

Example 55 includes the subject matter of any of Examples 44-54, and further including means for providing the decompressed data to a Lempel-Ziv decompression algorithm.

Example 56 includes the subject matter of any of Examples 44-55, and wherein the compressed data is compressed into multiple blocks and the means for reading a tree descriptor from the compressed data comprises means for reading a first tree descriptor for a first block; and the means for storing the one or more tables in association with the read tree descriptor comprises means for storing the one or more tables in association with the first tree descriptor; and the managed node further comprises means for reading a second tree descriptor for a second block in the compressed data; and means for determining whether the second tree descriptor matches the first tree descriptor.

Example 57 includes the subject matter of any of Examples 44-56, and wherein the means for determining whether the read tree descriptor matches a cached tree descriptor in the cache memory comprises means for performing a bit-by-bit comparison of the read tree descriptor to one or more cached tree descriptors.

Example 58 includes the subject matter of any of Examples 44-57, and wherein the means for obtaining the compressed data comprises means for obtaining a stream of compressed blocks of data.

Example 59 includes the subject matter of any of Examples 44-58, and further including means for determining a set of trees to use to compress data of different types; means for receiving a request to compress data; means for obtaining the data to be compressed; means for determining the type of the obtained data; and means for compressing the obtained data with one or more of the determined trees associated with the determined type of the obtained data.

Example 60 includes the subject matter of any of Examples 44-59, and wherein the means for determining a set of trees to use to compress data of different types comprises means for evaluating compression ratios with different sets of trees for each of multiple types of data.

Example 61 includes the subject matter of any of Examples 44-60, and wherein the means for determining a set of trees to use to compress data of different types comprises means for determining a fixed set of trees to compress at least one of log data, metadata, or genome data.

Example 62 includes the subject matter of any of Examples 44-61, and wherein the means for determining the type of the data comprises means for determining the type from at least one of a header, metadata, or a hash of the data.

Example 63 includes the subject matter of any of Examples 44-62, and wherein the means for determining the type of the data comprises means for determining the type from a source of a request to compress the data.

Example 64 includes the subject matter of any of Examples 44-63, and wherein the means for compressing the data with the determined set of trees comprises means for limiting the number of different trees used to compress the data to a predefined number to be cached by a decompressor of the compressed data.

The invention claimed is:

1. A managed node for efficiently decompressing data, the managed node comprising:
   a cache memory; and
   a data manager to:
      parse, in response to a determination that a read tree descriptor does not match a cached tree descriptor, the read tree descriptor to construct one or more tables indicative of codes in compressed data, wherein each code corresponds to a different symbol, and wherein the one or more tables include a literal-length table indicative of codes that correspond to literal symbols and length symbols and a distance table indicative of codes that correspond to distance symbols;
      decompress the compressed data with the one or more tables; and
      store the literal-length table in association with the read tree descriptor in the cache memory for subsequent use and exclude the distance table from the cache memory.

2. The managed node of claim 1, wherein the data manager is further to:
   obtain the compressed data, wherein the data is compressed with one or more trees indicative of frequencies of the symbols in an uncompressed form of the data;
   read a tree descriptor from the compressed data, wherein the tree descriptor is a variable length sequence of values indicative of a structure of the one or more trees; and
   determine whether the read tree descriptor matches a cached tree descriptor in the cache memory.

3. The managed node of claim 2, wherein the data manager is further to:
   select, in response to a determination that the read tree descriptor matches a cached tree descriptor, one or more tables stored in the cache memory in association with the cached tree descriptor; and
   decompress the compressed data with the selected one or more tables.

4. The managed node of claim 2, wherein to obtain the compressed data comprises to obtain data compressed with one or more Huffman trees.

5. The managed node of claim 2, wherein to obtain the compressed data comprises to obtain data in multiple blocks compressed with a literal-length tree indicative of the codes that correspond with the literal symbols and length symbols, and a distance tree indicative of the codes that correspond with the distance symbols.

6. The managed node of claim 2, wherein the data manager is further to store a tag indicative of the tree descriptor and the one or more constructed tables in the cache memory.

7. The managed node of claim 6, wherein to the store the tag further comprises to determine whether to evict at least one other tag and one or more associated tables from the cache memory as a function of a capacity of the cache memory.

8. The managed node of claim 6, wherein to obtain the compressed data comprises to obtain the compressed data in response to receipt of a request that includes one or more hints indicative of whether to retain one or more tags and associated tables in the cache memory; and
   wherein to the store the tag further comprises to determine whether to evict at least one other tag and the associated one or more tables from the cache memory as a function of the one or more hints.

9. The managed node of claim 6, wherein the data manager is further to store time data indicative of the last time the one or more cached tables associated with the tag were used to decompress data.

10. The managed node of claim 1, wherein the data manager is further to provide the decompressed data to a Lempel-Ziv decompression algorithm.

11. One or more non-transitory machine-readable storage media comprising a plurality of instructions stored thereon that, when executed by a managed node, cause the managed node to:
   parse, in response to a determination that a read tree descriptor does not match a cached tree descriptor, the read tree descriptor to construct one or more tables indicative of codes in compressed data, wherein each code corresponds to a different symbol, and wherein the one or more tables include a literal-length table indicative of codes that correspond to literal symbols and length symbols and a distance table indicative of codes that correspond to distance symbols;
   decompress the compressed data with the one or more tables; and store the literal-length table in association with the read tree descriptor in a cache memory for subsequent use and exclude the distance table from the cache memory.

12. The one or more non-transitory machine-readable storage media of claim 11, wherein the plurality of instructions, when executed, further cause the managed node to:
obtain the compressed data, wherein the data is compressed with one or more trees indicative of frequencies of symbols in an uncompressed form of the data;
read a tree descriptor from the compressed data, wherein the tree descriptor is a variable length sequence of values indicative of a structure of the one or more trees; and
determine whether the read tree descriptor matches a cached tree descriptor in the cache memory.

13. The one or more non-transitory machine-readable storage media of claim 12, wherein the plurality of instructions, when executed, further cause the managed node to:
select, in response to a determination that the read tree descriptor matches a cached tree descriptor, one or more tables stored in the cache memory in association with the cached tree descriptor; and
decompress the compressed data with the selected one or more tables.

14. The one or more non-transitory machine-readable storage media of claim 12, wherein to obtain the compressed data comprises to obtain data compressed with one or more Huffman trees.

15. The one or more non-transitory machine-readable storage media of claim 12, wherein to obtain the compressed data comprises to obtain data in multiple blocks compressed with a literal-length tree indicative of the codes that correspond with the literal symbols and length symbols, and a distance tree indicative of the codes that correspond with the distance symbols.

16. The one or more non-transitory machine-readable storage media of claim 12, wherein the plurality of instructions, when executed, further cause the managed node to store a tag indicative of the tree descriptor and the one or more constructed tables in the cache memory.

17. The one or more non-transitory machine-readable storage media of claim 16, wherein to the store the tag further comprises to determine whether to evict at least one other tag and one or more associated tables from the cache memory as a function of a capacity of the cache memory.

18. The one or more non-transitory machine-readable storage media of claim 16, wherein to obtain the compressed data comprises to obtain the compressed data in response to receipt of a request that includes one or more hints indicative of whether to retain one or more tags and associated tables in the cache memory; and
wherein to the store the tag further comprises to determine whether to evict at least one other tag and the associated one or more tables from the cache memory as a function of the one or more hints.

19. The one or more non-transitory machine-readable storage media of claim 16, wherein the plurality of instructions, when executed, further cause the managed node to store time data indicative of the last time the one or more cached tables associated with the tag were used to decompress data.

20. A method for efficiently decompressing data, the method comprising:
parsing, by a managed node and in response to a determination that a read tree descriptor does not match a cached tree descriptor, the read tree descriptor to construct one or more tables indicative of codes in compressed data, wherein each code corresponds to a different symbol, and wherein the one or more tables include a literal-length table indicative of codes that correspond to literal symbols and length symbols and a distance table indicative of codes that correspond to distance symbols;
decompressing, by the managed node, the compressed data with the one or more tables; and
storing, by the managed node, the literal-length table in association with the read tree descriptor in the cache memory for subsequent use and excluding the distance table from the cache memory.

21. The method of claim 20, further comprising:
obtaining, by the managed node, the compressed data, wherein the data is compressed with one or more trees indicative of frequencies of symbols in an uncompressed form of the data;
reading, by the managed node, a tree descriptor from the compressed data, wherein the tree descriptor is a variable length sequence of values indicative of a structure of the one or more trees; and
determining, by the managed node, whether the read tree descriptor matches a cached tree descriptor in the cache memory.

* * * * *